United States Patent [19]
Jones

[11] Patent Number: 5,463,879
[45] Date of Patent: Nov. 7, 1995

[54] HEAT CASCADING REGENERATIVE SORPTION HEAT PUMP

[75] Inventor: Jack A. Jones, Los Angeles, Calif.

[73] Assignee: California Institute of Technology, Pasadena, Calif.

[21] Appl. No.: 177,291

[22] Filed: Jan. 4, 1994

[51] Int. Cl.$^6$ ............................. F17C 11/00; F25B 17/08
[52] U.S. Cl. ................................. 62/480; 62/467; 62/476
[58] Field of Search ............................. 62/476, 480, 101, 62/467, 335

[56] References Cited

U.S. PATENT DOCUMENTS

| | | | |
|---|---|---|---|
| 4,610,148 | 9/1986 | Shelton | 62/480 |
| 4,623,018 | 11/1986 | Takeshita et al. | 165/104.12 |
| 4,637,218 | 1/1987 | Tchernev | 62/106 |
| 4,694,659 | 9/1987 | Shelton | 62/106 |
| 4,732,008 | 3/1988 | DeVault | 62/79 |
| 4,827,728 | 5/1989 | DeVault et al. | 62/79 |
| 4,848,994 | 7/1989 | Rockenfeller | 62/4 |
| 4,875,346 | 10/1989 | Jones et al. | 62/467 |
| 5,025,635 | 6/1991 | Rockenfeller | 62/106 |
| 5,042,259 | 8/1991 | Jones | 62/46.2 |
| 5,046,319 | 9/1991 | Jones | 62/46.2 |
| 5,079,928 | 1/1992 | Rockenfeller et al. | 62/106 |
| 5,157,938 | 10/1992 | Bard et al. | 62/335 |

OTHER PUBLICATIONS

High Efficiency Sorption Refrigerator Design, Advances In Cryogenic Engineering, vol. 35, pp. 1375–1382, Plenum Press, New York, Sep. 1990.

Design and Component Test Performance of an Efficient 4 W, 130 K. Sorption Refrigerator, Advances In Cryogenic Engineering, vol. 35, pp. 1367–1374, Plenum Press, New York, Oct. 1990.

Solid–Vapor Adsorption Refrigeration System Development, Gas Research Institute Report No. GRI–88/0273, Oct. 1988.

Development of a High–Efficiency, Gas–Fired, Absorption Heat Pump for Residential and Small–Commercial Appllications, U.S. Department of Energy, Paper No. DE91 010442, Sep. 1990, by Phillips Engineering Co.

(List continued on next page.)

Primary Examiner—Henry A. Bennett
Assistant Examiner—William C. Doerrler
Attorney, Agent, or Firm—F. Eugene Logan

[57] ABSTRACT

A simple heat cascading regenerative sorption heat pump process with rejected or waste heat from a higher temperature chemisorption circuit ("HTCC") powering a lower temperature physisorption circuit ("LTPC") which provides a 30% total improvement over simple regenerative physisorption compression heat pumps when ammonia is both the chemisorbate and physisorbate, and a total improvement of 50% or more for LTPC having two pressure stages. The HTCC contains ammonia and a chemisorbent therefor contained in a plurality of canisters, a condenser-evaporator-radiator system, and a heater, operatively connected together. The LTPC contains ammonia and a physisorbent therefor contained in a plurality of compressors, a condenser-evaporator-radiator system, operatively connected together. A closed heat transfer circuit ("CHTC") is provided which contains a flowing heat transfer liquid ("FHTL") in thermal communication with each canister and each compressor for cascading heat from the HTCC to the LTPC. Heat is regenerated within the LTPC by transferring heat from one compressor to another. In one embodiment the regeneration is performed by another CHTC containing another FHTL in thermal communication with each compressor. In another embodiment the HTCC powers a lower temperature ammonia water absorption circuit ("LTAWAC") which contains a generator-absorber system containing the absorbent, and a condenser-evaporator-radiator system, operatively connected together. The absorbent is water or an absorbent aqueous solution. A CHTC is provided which contains a FHTL in thermal communication with the generator for cascading heat from the HTCC to the LTAWAC. Heat is regenerated within the LTAWAC by transferring heat from the generator to the absorber. The chemical composition of the chemisorbent is different than the chemical composition of the physisorbent, and the absorbent. The chemical composition of the FHTL is different than the chemisorbent, the physisorbent, the absorbent, and ammonia.

48 Claims, 12 Drawing Sheets

OTHER PUBLICATIONS

Improving Adsorption Cryocoolers By Multi-stage Compression And Reducing Void Volume, Cryogenics, May 1986, vol. 26, pp. 450–458, by S. Bard.Sorption Cooler Technology Development At JPL, Cryogenics, Jun. 1990, vol. 30, pp. 239–245, by J. A. Jones.

ic. 5,463,879

HEAT CASCADING REGENERATIVE SORPTION HEAT PUMP

ORIGIN OF INVENTION

The invention described herein was made in the performance of work under a NASA Contract, and is subject to the provisions of Public Law 96-517 (35 USC 202) in which the Contractor has elected to retain title.

BACKGROUND OF THE INVENTION

1. Technical Field

This invention is directed towards regenerative heat pump system and method using a working fluid or refrigerant and an adsorbent material.

2. Discussion of the Invention

Heat pumps using solid adsorbent beds are well known as shown by U.S. Pat. Nos. 4,610,148, 4,637,218 4,694,659, 5,025,635, 5,046,319 and 5,079,928. In general since sorbents take up the working fluid when cooled and desorb the working fluid when heated, heat pumps are said to be heat driven. Often in adsorbent and chemisorbent heat pumps two beds of sorbents are used, one to adsorb the working fluid while the other bed is desorbing the working fluid. Alternate heating and cooling of the beds is the conventional procedure. When used in air conditioning, heat from an interior room may be used to evaporate the working fluid in an evaporator with heat rejection to the environment at ambient temperatures.

In all of such systems the efficiency of the apparatus is measured by its coefficient of performance or "COP". By the term "COP" as used herein is meant the ratio of heating or cooling work performed divided by the amount of power required to do the work. Since cooling $COP_S$, or $COP_{CS}$, are generally lower than heating $COP_S$, or $COP_{HS}$, many systems are rated on their cooling $COP_S$.

U.S. Pat. No. 4,637,218 mentions cooling $COP_S$ between 1 and 2 and heating $COP_S$ between 2 and 3. In U.S. Pat. No. 4,637,218 a hot coolant is pumped from a hot 204.4° C. sorbent compressor to a cooler 37.8° C. sorbent compressor, while at the same time cold coolant is pumped from the cooler sorbent compressor to the hotter sorbent compressor. Both compressors exchange heat yielding a typical heat regeneration efficiency of about 80%. The remainder of the heat is supplied by a boiler at about 204° C.

U.S. Pat. No. 4,610,148 reports a theoretical heating COP of about 3 and a cooling COP of about 2, and, a calculated operating $COP_H$ of about 2.6 and a calculated operating $COP_C$ of about 1.6.

FIG. 3 of U.S. Pat. No. 4,694,659, which is concerned with a dual sorbent bed heat pump, shows heating and cooling COP's as a function of a dimensionless thermal wavelength parameter.

Cryogenic cooler systems for sorption refrigerators using a sorption compressor, a heating/cooling loop and a Joule-Thomson expansion valve, or "J-T" valve, with methane as a refrigerant gas and charcoal as the adsorbent, are disclosed in articles entitled "High Efficiency sorption Refrigerator Design", and, "Design and Component Test Performance of an Efficient 4 W, 130 K Sorption Refrigerator" in Advances In Cryogenic Engineering, Vol. 35, Plenum Press, New York, 1990. Desorption occurs at 4.46 MPa (646 psia), i.e. $P_H$, and adsorption at 0.15 MPa (22 psia), i.e. $P_L$, or a pressure ratio of about 30, i.e. $P_H/P_L=30$. Methane is expanded from 4.46 MPa to 0.15 MPa to achieve cooling below 130° K. (−143° C.). The sorbent is heated from 240° K. (−33° C.) to 600° K. (327° C.) to desorb the methane.

U.S. Pat. Nos. 4,875,346 and 5,157,938 disclose cryogenic refrigeration systems in which heat is transferred by helium heat transfer gas from a higher temperature circuit to a lower temperature circuit. When heat is to be transferred, helium is charged to annular gas-gaps between concentric higher and lower temperature circuits. The helium heat transfer fluid is not recycled in a closed loop bt exhausted to a vacuum such as outer space leaving a vacuum in the gas-gaps when no heat is to be transferred between circuits. The working fluids used in the system are xenon, krypton and oxygen.

U.S. Pat. No. 4,732,008 uses heat from a high condenser and high absorber of a higher temperature solution pair to heat a low generator of a lower temperature solution pair.

U.S. Pat. No. 4,827,728 uses a heat exchanger for heating the generator of the absorption circuit with heat rejected from the condenser and absorber of a medium absorption circuit.

U.S. Pat. Nos. 5,025,635 and 5,079,928 transfer heat with a heat transfer fluid from one chemisorbent to another chemisorbent, e.g. from $MgBr_2$ to $CoBr_2$ to $CoCl_2$ to $CaBr$ to $SrBr_2$.

U.S. Pat. No. 5,042,259 discloses a regenerative hydride heat pump system for regenerating the sensible heat of the system which involves a series of at least four canisters containing a lower temperature performing hydride and a series of at least four canisters containing a higher temperature performing hydride. Each canister contains a heat conductive passageway through which a heat transfer fluid is circulated so that sensible heat is regenerated.

Gas Research Institute Report No GRI-88/0273 of October 1988, entitled Solid-Vapor Adsorption Refrigeration System Development, discusses solid-vapor inorganic complex compounds such as hydrates and amines and cycles for use in industrial refrigeration applications. Vapor pressure plots of compounds CC260-1260 and CC260-1300, which are solid inorganic complex compounds and are useful adsorbents for use in this invention, are found on pages 23 and 29 of Report No. GRI-88/0273.

U.S. Department of Energy, Paper No. DE91 010442, entitled Development of a High-Efficiency, Gas-Fired, Absorption Heat Pump for Residential and Small-Commercial Applications, September 1990, by Phillips Engineering Co. discusses the generator-absorber heat-exchange (GAX) cycle using ammonia-water as the fluid pair; and FIG. 14 thereof is a schematic flow diagram of the GAX absorption unit.

Chemisorbents useful for the higher temperature circuit of this invention are set forth in U.S. Pat. Nos. 4,848,994, 5,025,635 and 5,079,928.

A two staged adsorption system is disclosed in an article entitled "Improving Adsorption Cryocoolers By Multi-stage Compression And Reducing Void Volume", Cryogenics, 1986, Vol 26, page 456, by S. Bard. Refrigerant is passed between carbon adsorbent stages. However, a circuit for the heat transfer fluid for regenerating heat was not shown. It is understood that the heat was simply exhausted and not regenerated.

U.S. Pat. No. 5,025,635 discloses staged adsorbers each containing different adsorbents, i.e. $MgBr_2$, $CoBr_2$, $CoCl_2$, $CaBr_2$ and $SrBr_2$ in a single housing U.S. Pat. No. 5,079,928 mentions that some reactors in a staged system can be combined into a single reactor.

Regenerative heat transfer fluid circuits for a single stage system are disclosed in U.S. Pat. No. 5,046,319.

Other references of interest are U.S. Pat. Nos. 4,732,008, 4,827,728 and 4,848,994, and an article entitled "Sorption Cooler Technology Development At JPL", Cryogenics, 1990, Vol 30, page 239, by J. A. Jones.

SUMMARY OF THE INVENTION

The following terms are used herein. By the term "chemisorbent" as used herein is meant chemical absorbent. By the term "chemisorption" as used herein is meant chemical absorption. By the term "physisorbent" as used herein is meant physical absorbent or physical adsorbent. By the term "physisorption" as used herein is meant physical absorption or physical adsorption. The term "canister" is used for the reactor containing the chemisorbent. The term "compressor" is used for the reactor containing the physisorbent or physical adsorbent.

Accordingly, there is provided by the principles of this invention a heat cascading regenerative sorption heat pump process with waste or rejected heat from a higher temperature chemisorption circuit powering a lower temperature physical adsorption circuit. The process comprises providing a higher temperature ammonia chemisorption circuit containing ammonia and a chemisorbent having a first chemical composition operable for chemisorbing and desorbing ammonia. The ammonia chemisorption circuit comprises a plurality of canisters each containing the chemisorbent, first condensing means, first evaporating means for cooling a low temperature load, first heating means for heating the chemisorbent to a first upper temperature for desorption of ammonia, and first cooling means for cooling the chemisorbent, operatively connected together. Each canister has a heat transfer element in thermal communication with, but not in fluid communication with, the chemisorbent therein.

The process further comprises providing a lower temperature ammonia physical adsorption circuit containing ammonia and a physical adsorbent having a second chemical composition operable for physically adsorbing and desorbing ammonia, the second chemical composition being different than the first chemical composition. The ammonia physical adsorption circuit comprises adsorption/desorption means containing the physical adsorbent and having a first part for desorbing ammonia and a second part for adsorbing ammonia, second condensing means, second evaporating means for cooling a low temperature load, second heating means for heating the physical adsorbent in the first part of the adsorption/desorption means to a second upper temperature for desorption of ammonia, and second cooling means for rejecting heat therefrom, operatively connected together.

The process also comprises providing at least one first closed heat transfer circuit containing a first heat transfer liquid which is different than the chemisorbent, the physical adsorbent and ammonia. The first closed heat transfer circuit comprising the heat transfer element of at least one canister, and heat exchange means in thermal communication with the first part of the adsorption/desorption means but not in fluid communication with the physical adsorbent.

In the process, cooling the chemisorbent by the first cooling means is by flowing the first heat transfer liquid through the heat transfer element of the at least one canister thereby cooling it and the chemisorbent therein. In this process, heating the first part of the adsorption/desorption means and the physical adsorbent therein by the second heating means to a second upper temperature for desorption of ammonia is by flowing the first heat transfer liquid from the at least one canister through the heat exchange means thereby heating the first part, and thereby cascading heat from the higher temperature ammonia chemisorption circuit to the lower temperature ammonia physical adsorption circuit. The process further includes regenerating heat within the adsorption/desorption means by transferring heat from the first part thereof to the second part thereof.

In one embodiment, the first heating means for heating the chemisorbent to a first upper temperature for desorption of ammonia provides the entire net heat added to the process.

In another embodiment, rejecting heat from the lower temperature ammonia physical adsorption circuit is by transferring heat from the second part of the adsorption/desorption means to a third low temperature heat sink, thereby cooling the second part.

In one embodiment the chemisorbent is selected from the group consisting of $MgCl_2$, $CaBr_2$, $SrBr_2$, $CoBr_2$, and solid inorganic ammoniated complex compounds. In another embodiment, the chemisorbent is a solid inorganic complex compound selected from the group consisting of alkaline earth metal chlorides, bromides and chlorate salts, metal chlorides, bromides and chlorate salts in which the metal is Cr, Mn, Fe, Co, Ni, Ca, Ta or Re, a double chloride salt selected from $NH_4AlCl_4$, $NaAlCl_4$, $(NH_4)_2ZnCl_4$, $(NH_4)_3ZnCl_5$, $K_2ZnCl_4$, $CsCuCl_3$, and $K_2FeCl_5$, and NaBr and $NH_4Cl$. Non-limiting examples of some useful ammoniated complex compounds, the limits of the ligand and temperature ranges are given in U.S. Pat. No. 4,848,994, which is hereby incorporated herein by reference.

In another embodiment, the physical adsorbent is selected from the group consisting of activated carbon, zeolite, alumina and silica gel.

In one embodiment heating the at least one canister to the first upper temperature comprises heating it directly with the first heating means.

In another embodiment, the heating the at least one canister to the first upper temperature comprises heating the flowing first heat transfer liquid with the first heating means thereby producing a heated flowing first heat transfer liquid, and flowing the heated first heat transfer liquid to the at least one canister, and transferring heat from the heated flowing first heat transfer liquid to the at least one canister.

In one embodiment, the first low temperature heat load is an interior space in a structure, and the second low temperature heat load is also an interior space in the structure.

In one embodiment, the process further comprising regenerating heat within the higher temperature chemisorption circuit by transferring heat from at least one hotter temperature canister to at least one cooler temperature canister.

In another embodiment, the process further comprising, after the flowing first heat transfer liquid has transferred heat to the first part of the adsorption/desorption means, regenerating heat within the higher temperature chemisorption circuit by transferring heat from the flowing first heat transfer liquid to at least another one of the canisters.

In one embodiment, the first condensing means is also the second condensing means, the first evaporating means is also the second evaporating means, and the first low temperature heat load is also the second low temperature heat load.

In one embodiment, the second upper temperature is lower than the first lower temperature. In another embodiment, the second upper temperature is higher than the first lower temperature.

In one embodiment, after flowing the first heat transfer liquid to the heat exchange means of the first part of the adsorption/desorption means, the process further comprises flowing the first heat transfer liquid through the heat transfer element of at least one other canister.

In one embodiment, the third low temperature heat sink is the ambient environment.

In another embodiment, the adsorption/desorption means is a plurality of physical adsorption compressors each containing the physical adsorbent, and the process comprises heating at least one compressor to a second upper temperature and desorbing ammonia from the physical adsorbent therein. In this embodiment, the heat exchange means is in thermal communication with the at least one compressor and the process further comprises heating the at least one compressor to the second upper temperature by transferring heat from the flowing first heat transfer liquid to the heat exchange means, and transferring heat from the heat exchange means to the at least one compressor, thereby cascading heat from the higher temperature ammonia chemisorption circuit to the lower temperature ammonia physical adsorption circuit. In a further embodiment, regenerating heat within the physical adsorption circuit is by transferring heat from the at least one compressor to the at least one other compressor; and cooling at least one compressor by transferring heat therefrom to a third low temperature heat sink.

In one embodiment, after flowing the first heat transfer liquid to the heat exchange means of the at least one compressor, the process further comprises flowing the first heat transfer liquid through the heat transfer element of at least one other canister.

In another embodiment, the process further comprising providing a second closed heat transfer circuit containing a second heat transfer liquid, the second closed heat transfer circuit comprising a heat transfer element in thermal communication with each compressor but not in fluid communication with the physical adsorbent. A further embodiment comprises regenerating heat within the physical adsorption circuit by flowing the second heat transfer liquid through the heat transfer element of each compressor and transferring heat between the flowing second heat transfer liquid and the heat transfer elements. In another further embodiment, transferring heat from the heat exchange means to the at least one compressor comprises transferring heat from the heat exchange means to the flowing second heat transfer liquid, and then transferring heat from the flowing second heat transfer liquid to the heat transfer element of the at least one compressor.

In one embodiment, the process further comprises directing the flowing second heat transfer liquid to and from the heat transfer elements of the compressors in a predetermined order so that the flowing second heat transfer liquid exiting from the third heat sink flows first to the heat transfer element of the compressor operating at the second lower temperature, then in series to the heat transfer elements of the other compressors, and then back to the third heat sink.

In another embodiment, the process further comprises activating and deactivating the first heating means in a predetermined order, directing the flowing first heat transfer liquid to and from the canisters in a predetermined order, directing the flowing second heat transfer liquid to and from the heat transfer elements of the compressors in a predetermined order, and sequentially advancing the predetermined order of compressors being heated to the second upper temperature. In a further embodiment, directing the flowing first heat transfer liquid to and from the canisters in a predetermined order is such that the flowing first heat transfer liquid exiting from a canister cooling from the first upper temperature transfers heat indirectly to a compressor operating at the second upper temperature. In another embodiment, directing the flowing first heat transfer liquid to and from the canisters in a predetermined order is such that the flowing first heat transfer liquid exiting from a canister operating at the first lower temperature transfers heat indirectly to a compressor operating at the second upper temperature.

Further examples of control of regenerative adsorption heat pump processes are described in U.S. Pat. No. 5,046,319 and U.S. patent application Ser. No. 07/855,642 filed Apr. 30, 1992, which are hereby incorporated herein by reference.

Further examples of control of chemisorbent heat pump processes are described in U.S. Pat. No. 5,042,259 which is hereby incorporated herein by reference.

In one embodiment, the number of the at least one first closed heat transfer circuit is equal to the number of the canisters. In another embodiment, the number of the at least one first closed heat transfer circuit is two. In one embodiment, wherein the number of the at least one first closed heat transfer circuit is two, the process further comprises performing heating of the at least one canister to the first upper temperature in one of the closed first heat transfer circuits, and performing heating the at least one compressor to the second upper temperature in the other one of the closed first heat transfer circuits.

In one embodiment, the process further comprises providing a second closed heat transfer circuit containing a flowing second heat transfer liquid, the second closed heat transfer circuit having a heat transfer element in thermal communication with each compressor but not in fluid communication with the physical adsorbent, and the heat exchange means comprises a plurality of heat exchangers, the number of heat exchangers being equal to the number of compressors, and further comprising pairing a heat exchanger with each compressor. In this embodiment transferring heat from the flowing first heat transfer liquid to the heat exchange means comprises directing the flowing first heat transfer liquid from the canister cascading heat to the lower temperature ammonia chemisorption circuit, to the heat exchanger paired with the compressor receiving cascading heat from the higher temperature ammonia physical adsorption circuit, and directing the flowing second heat transfer liquid to the heat exchanger paired with the compressor receiving cascading heat thereby producing a heated flowing second heat transfer liquid, and thereafter flowing the heated second heat transfer liquid to the heat transfer element of the compressor receiving cascading heat.

In a further embodiment, the process includes controlling the second upper temperature during desorption of the physical adsorbent in each compressor so that the pressure in the compressor during such desorption is equal to pressure in the canisters during desorption of the chemisorbent in the canisters.

In one embodiment of this invention the heat cascading regenerative sorption heat pump process further comprises providing each canister with a heat transfer element in thermal communication with the chemisorbent therein but not in fluid communication with the chemisorbent, and providing each compressor with a heat transfer element in thermal communication with the physical adsorbent therein but not in fluid communication with the physical adsorbent. In this embodiment the process includes providing a plurality of heat exchangers, the number of which are equal to the number of the compressors. Each heat exchanger has a first section in thermal communication with the a second section. The process includes pairing a heat exchanger with each compressor. The process further comprises providing a plurality of first closed heat transfer circuits each containing a first heat transfer liquid, the number of the first closed heat transfer circuits being equal to the number of the canisters. Each first closed heat transfer circuit comprises the heat transfer element of one canister, the first section of at least one of the heat exchangers, and pumping means for flowing the first heat transfer liquid therein. The process also includes providing a second closed heat transfer circuit containing a second heat transfer liquid. The second closed heat transfer circuit comprises the heat transfer elements of the compressors, the second sections of the heat exchangers, and pumping means for flowing the second heat transfer liquid therein. The process includes flowing the first heat transfer liquid through the heat transfer element of at least one canister, and then to the first section of one heat exchanger. Heating the at least one compressor to the second upper temperature comprises transferring heat from the flowing first heat transfer liquid in the first section to the flowing second heat transfer liquid in the second section, and transferring heat from the flowing second heat transfer liquid to the heat transfer element of the compressor being heated to the second upper temperature. The process also includes regenerating heat within the physical adsorption circuit by flowing the second heat transfer liquid from the heat transfer element of the hottest compressor to the heat transfer element of another compressor, thereby transferring heat from the physical adsorbent in one compressor to the physical adsorbent in another compressor. The process further includes cooling the second heat transfer liquid by transferring heat therefrom to a third low temperature heat sink and flowing the cooled second heat transfer liquid to one of the compressors thereby cooling it.

In one embodiment the heat transfer fluid is selected from the group consisting of mixtures of diphenyl and diphenyl oxide, ortho-dichlorobenzene, ethylene glycol, methoxypropanol, silicon oils, and water. Examples of such heat transfer fluids are the Dowtherm™ fluids.

In another embodiment, the compressors have two pressure stages with a lower stage operating over a low to intermediate pressure range and a higher stage operating over an intermediate to high pressure range. In a further embodiment, the low temperature heat load being cooled by the process is a refrigerator and freezer combination.

Further examples of staged regenerative sorption heat pump processes are described in my patent application Ser. No. 8/113,611, filed AUG. 27, 1993, which is hereby incorporated herein by reference.

There is also provided by the principles of this invention a heat cascading regenerative sorption heat pump process with rejected heat from a higher temperature chemisorption circuit powering a lower temperature water absorption circuit. The process comprises providing a higher temperature ammonia chemisorption circuit containing ammonia and a chemisorbent, the chemisorbent having a first chemical composition operable for chemisorbing and desorbing ammonia. All of the higher temperature ammonia chemisorption circuit described above with the lower temperature physical adsorption circuit can also be used in this embodiment.

The process further comprises providing a lower temperature ammonia water absorption circuit containing ammonia and an absorbent selected from the group consisting of water and absorbent aqueous solutions operable for absorbing and desorbing ammonia. The absorbent having a second chemical composition operable for physically absorbing and desorbing ammonia, the second chemical composition being different than the first chemical composition. The lower temperature ammonia water absorption circuit comprises absorption/desorption means containing the absorbent and having a first part for desorbing ammonia and a second part for absorbing ammonia, second condensing means, second evaporating means for cooling a low temperature load, second heating means for heating the first part of the absorption/desorption means and the absorbent therein to a second upper temperature for desorption of ammonia, and second cooling means for rejecting heat therefrom, operatively connected together.

The process also comprises providing at least one first closed heat transfer circuit containing a first heat transfer liquid, the first heat transfer liquid being different than the chemisorbent, the absorbent and ammonia, the first closed heat transfer circuit comprising the heat transfer element of at least one canister, and heat exchange means in thermal communication with the first part of the absorption/desorption means but not in fluid communication with the absorbent.

In the process cooling the chemisorbent by the first cooling means is by flowing the first heat transfer liquid through the heat transfer element of the at least one canister thereby cooling it and the chemisorbent therein. In this process, heating the first part of the absorption/desorption means and the absorbent therein by the second heating means to a second upper temperature for desorption of ammonia is by flowing the first heat transfer liquid from the at least one canister through the heat exchange means thereby heating the first part, and thereby cascading heat from the higher temperature ammonia chemisorption circuit to the lower temperature ammonia water absorption circuit. The process further includes regenerating heat within the absorption/desorption means by transferring heat from the first part thereof to the second part thereof.

In one embodiment, the first heating means for heating the chemisorbent to a first upper temperature for desorption of ammonia provides the entire net heat added to the process.

In another embodiment, rejecting heat from the lower temperature ammonia water absorption circuit is by transferring heat from the second part of the absorption/desorption means to a third low temperature heat sink, thereby cooling the second part.

In one embodiment, the chemisorbent is selected from the group consisting of $MgCl_2$, $CaBr_2$, $SrBr_2$, $CoBr_2$, and solid inorganic ammoniated complex compounds.

In another embodiment, the absorbent for the lower temperature circuit is water.

In one embodiment, the first part of the absorption/desorption means is a generator for separating a strong aqueous ammonia solution into a gaseous ammonia stream and a weak aqueous ammonia solution stream, and the second part of the absorption/desorption means is an absorber for absorbing a gaseous ammonia stream in the weak aqueous ammonia solution stream. In a further embodiment, the ammonia water absorption circuit containing ammonia is an AHE circuit, and in another embodiment it is an GAX circuit.

In another embodiment, the second upper temperature is lower than the first lower temperature.

In one embodiment the heat transfer fluid is selected from the group consisting of mixtures of diphenyl and diphenyl oxide, ortho-dichlorobenzene, ethylene glycol, methoxypropanol, silicon oils, and water. Examples of such heat transfer fluids are the Dowtherm® fluids.

DESCRIPTION OF THE PREFERRED EMBODIMENTS

Figure 1:
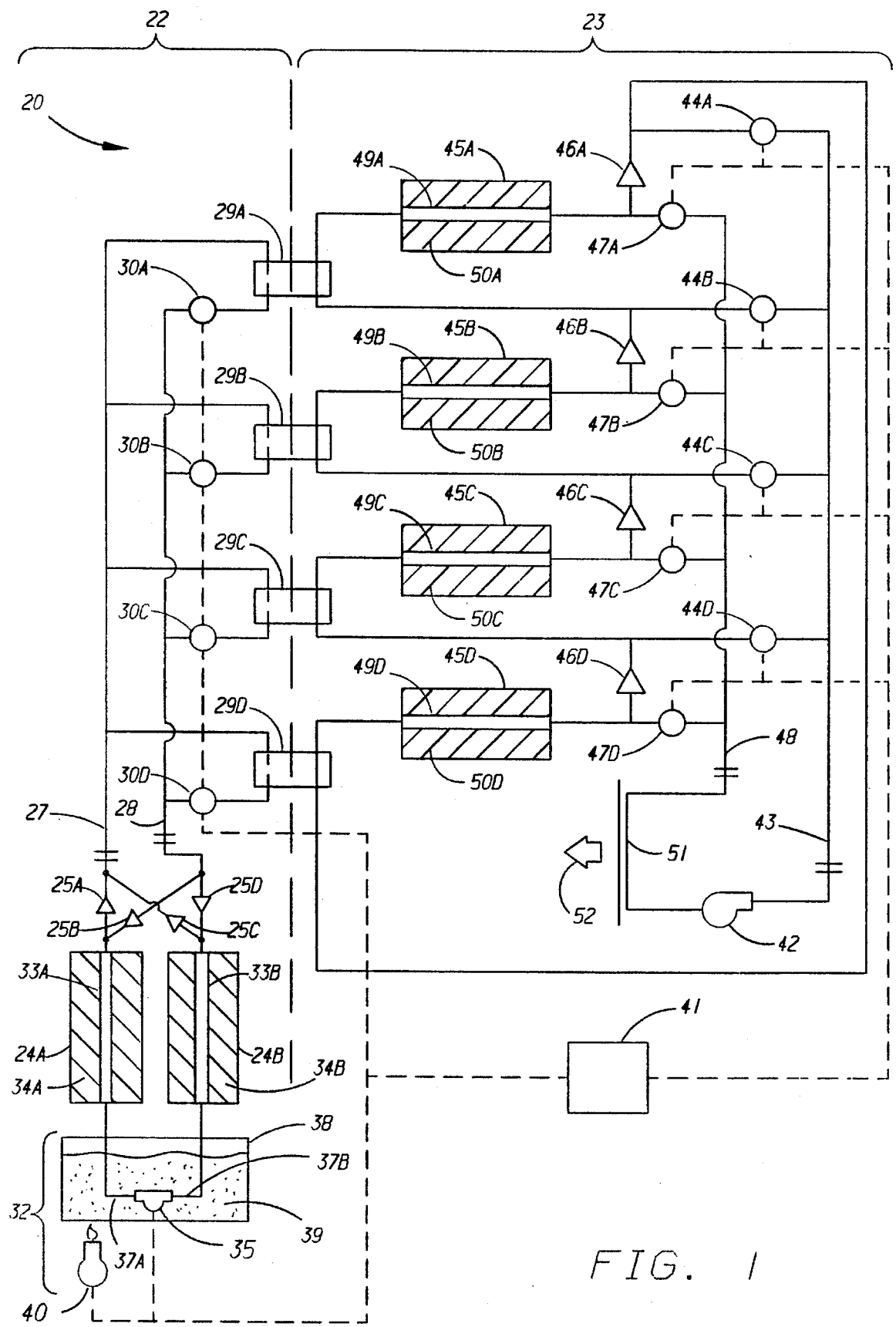
FIG. 1 is schematic flow diagram of the heat transfer circuit of a chemisorption circuit and a physisorption circuit of this invention.

With reference to the drawings, like characters are employed to designate like parts. With particular reference first to FIG. 1, a schematic flow diagram is shown, generally designated by numeral 20, of the heat transfer fluid circuit of one embodiment of this invention for a heat cascading regenerative sorption heat pump system. In this embodiment waste heat from a higher temperature ammonia chemisorption circuit 22 is used to power a lower temperature ammonia physisorption circuit 23.

As shown in FIG. 1, the higher temperature chemisorption heat transfer fluid circuit 22 comprises two canisters 24A and 24B, check valves 25A, 25B, 25C and 25D, manifolds 27 and 28, the chemisorption sides of heat exchangers 29A, 29B, 29C and 29D, solenoid valves 30A, 30B, 30C and 30D (i.e. valve set 30), and external heat source 32.

Chemisorption canisters 24A and 24B, contain heat transfer elements 33A and 33B, respectively, surrounded by chemisorbents 34A and 34B for ammonia. One end of heat transfer element 33A is connected to lines containing check valves 25A and 25B, which are connected to the inlet of manifold 27, and the outlet of manifold 28, respectively. One end of heat transfer element 33B is connected to lines containing check valves 25C and 25D, which are connected to the inlet of manifold 27 and the outlet of manifold 28, respectively. The outlets of manifold 27 are connected to the chemisorption side of heat exchangers 29A, 29B, 29C and 29D, which are connected to solenoid valves 30A, 30B, 30C and 30D, respectively, which are connected to inlets of manifold 28. The other ends of heat transfer elements 33A and 33B are connected to reversible pump 35, by lines 37A and 37B. A first heat transfer fluid is pumped through heat transfer elements 33A and 33B, and the chemisorption side of heat exchanger 29A, 29B 29C and 29D by pump 35.

External heat source 32 comprises vessel 38 containing bath heat transfer medium 39 and heating unit 40. Heating unit 40 heats bath medium 39 which in turn heats the first heat transfer fluid as it is being pumped through lines 37A and 37B. Heating means 40 can be gas or oil heat or any other heat source desired.

The lower temperature physisorption heat transfer fluid circuit 23 comprises pump 42, manifold 43, solenoid valves 44A 44B, 44C and 44D (i.e. valve set 44), the physisorption side of heat exchangers 29A, 29B, 29C and 29D physisorption compressors 45A, 45B, 45C and 45D, check valves 46A, 46B, 46C and 46D, solenoid valves 47A 47B, 47C and 47D (i.e. valve set 47), manifold 48 and radiator 51.

Physisorption compressors 45A 45B, 45C and 45D, contain heat transfer elements 49A, 49B, 49C and 49D respectively, surrounded by physisorbent 50A, 50B, 50C and 50D, respectively for ammonia.

The outlet of pump 42 is connected to the inlet of manifold 43. The outlets of manifold 43 are connected to solenoid valves 44A, 44B, 44C and 44D, which are connected to the physisorption side of heat exchangers 29A, 29B, 29C and 29D, respectively, which are connected to one of the ends of heat transfer elements 49A, 49B, 49C and 49D, respectively. The other ends of heat transfer elements 49A, 49B, 49C and 49D are connected to lines containing check valves 46A, 46B, 46C and 46D, and also to lines containing solenoid valves 47A, 47B, 47C and 47D. Solenoid valves 47A, 47B, 47C and 47D are connected to the inlets of manifold 48. The outlet of manifold 48 is connected to radiator 51 which is connected to the inlet of pump 42.

The outlet of check valves 46A, 46B, 46C and 46D are also connected to the physisorption side of heat exchangers 29A, 29B, 29C and 29D, respectively.

A second heat transfer fluid is pumped through the physisorption side of heat exchangers 29A, 29B, 29C and 29D, heat transfer elements 49A, 49B, 49C and 49D, and radiator 51, by pump 42.

Heat from the first heat transfer fluid in higher temperature chemisorption side of heat exchangers 29A, 29B, 29C and 29D heats the second heat transfer fluid as it is being pumped in counter-current flow through the physisorption side thereof, which in turn heats the physisorption compressors 45A, 45B, 45C and 45D.

Briefly stated, and understood by one skilled in the art, in operation, heated heat transfer fluid is directed by pump 35 to one of heat transfer elements 33A and 33B, then through one of heat exchangers 29A, 29B, 29C and 29D as a result a corresponding one of solenoid valves 30A, 30B, 30C and 30D being open while the remaining valves of valve set 30 are closed, and then through the remaining heat transfer elements.

In a similar manner, another heated heat transfer fluid flows through one of heat exchangers 29A, 29B, 29C and 29D, as a result one of solenoid valves 44A, 44B, 44C and 44D being open while the remaining valves of valve set 44 are closed, then through a corresponding one of heat transfer elements 49A, 49B, 49C and 49D, and then serially through the remaining heat transfer elements as a result of one of solenoid valves 47A, 47B, 47C and 47D being open while the remaining valves of valve set 47 are closed, before flowing through radiator 51 and back to pump 42. Radiator 51 rejects heat to a low temperature heat sink such as the environment, as indicated by arrow 52.

For example, if valve 30A is open, valves 44D and 47D will also be open and all other solenoid valves closed thereby causing, in series order from pump 42, to compressor 45C which is the coolest, to compressor 45B which is being cooled, to compressor 45A which is the hottest, to compressor 45D which is being heated, and then to radiator 51.

Referring to FIG. 1, solenoid valves 30A, 30B, 30C, 30D, 44A, 44B, 44C and 44D, 47A, 47B, 47C and 47D, are controlled by controller means 41 so that only one of valve set 30, only one of valve set 44, and only one of valve set 47, are open for a predetermined period of time during the base part and extended or bottoming part of each phase. Controller means 41 also controls reversible pump 35 so that the heat transfer fluid pumped therein flows in a first direction for a predetermined period of time, stops pumping for a predetermined period of time, or pumps in a reverse direction for a predetermined period of time. Controller means 41 further prevents heat cascading during the extended or bottoming part of any phase by stopping pump 35, and pumping the heat transfer fluid directly from pump 42 to a predetermined compressor and therefrom directly to radiator 51. Controller means 41 also controls external heating unit 40 so that heating of heat transfer medium 39 occurs only as need to maintain its temperature to a predetermined value.

Figure 2:
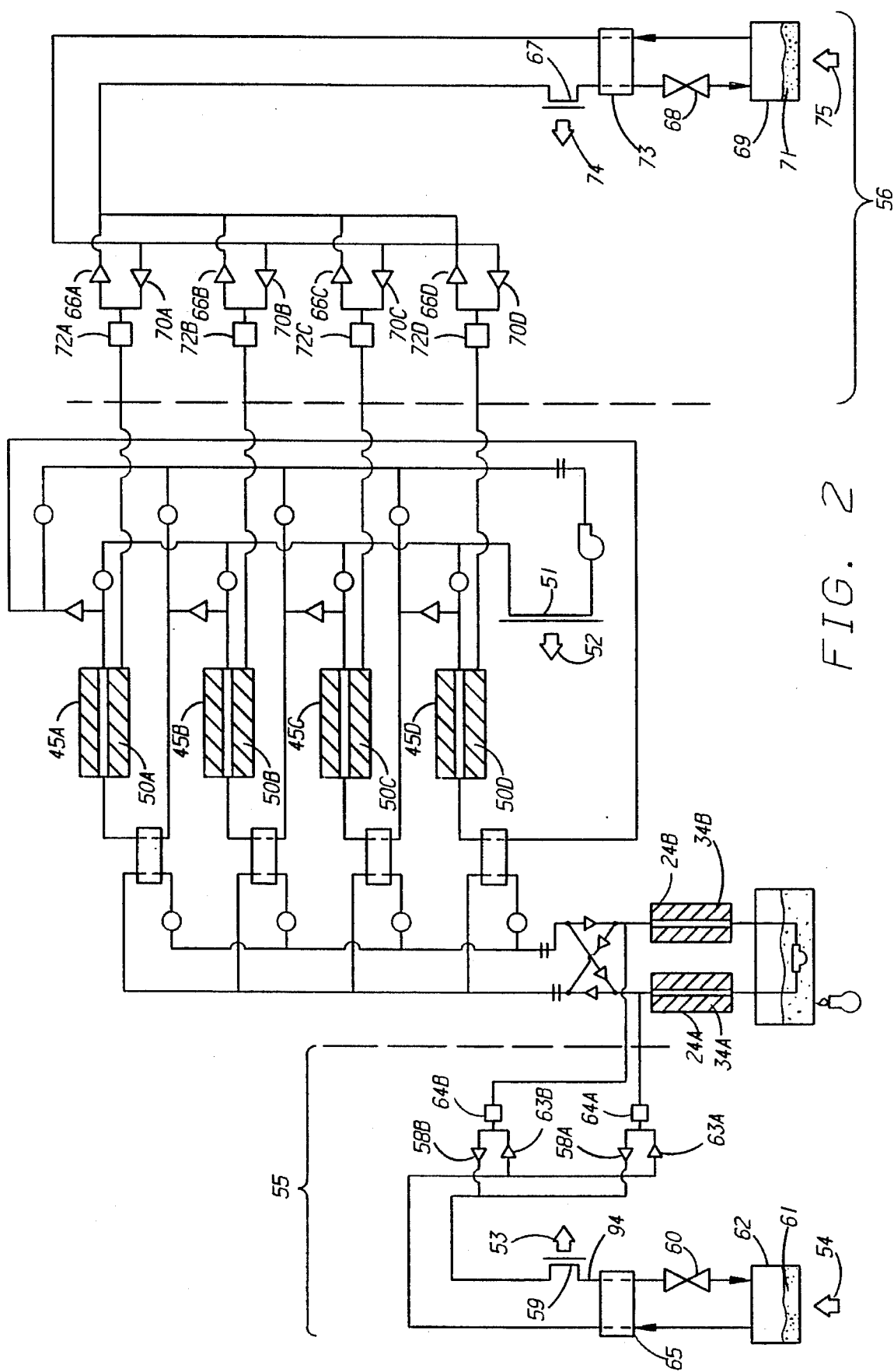
FIG. 2 is schematic flow diagram of the heat transfer circuit of FIG. 1 with a separate working fluid circuit for the chemisorption side and a physisorption side.

A schematic flow diagram for the working fluid or ammonia circuits that are used in conjunction with the heat transfer circuit of FIG. 1, is shown in FIG. 2, comprises higher temperature chemisorbent ammonia circuit 55 and lower temperature physisorbent ammonia circuit 56. Ammonia circuit 55 comprises chemisorbents 24A and 24B, check valves 58A and 58B, condenser 59, Joule-Thomson expansion means 60, evaporator means 62 containing a charge of liquid ammonia 61, check valves 63A and 63B, and preferably vapor regenerators 64A and 64B, and auxiliary heat exchanger 65. Briefly stated, and understood by one skilled in the art, in operation desorbed high temperature, high pressure ammonia from one of canisters 24A and 24B, flows through vapor regenerators 64A and 64B, through check valves 58A and 58B to condenser 59. Heat is rejected from condenser 59 to a low temperature heat sink such as the environment, as indicated by arrow 53, and the liquid ammonia is condensed to form a low temperature, high pressure liquid. The ammonia liquid is further cooled in auxiliary heat exchanger 65 and then expanded through Joule-Thomson valve 60 to form a low temperature, low pressure liquid, which is collected in evaporator means 62. A low temperature heat load, as indicated by arrow 54, vaporizes the liquid ammonia 61 to form a low temperature, low pressure ammonia gas. The low temperature, low pressure ammonia gas flows through one of check valves 63A and 63B into one of canisters 24A and 24B.

Similarly ammonia circuit 56 comprises physisorbents 50A, 50B, 50C and 50D, check valves 66A, 66B, 66C and 66D, condenser 67, Joule-Thomson expansion means 68, evaporator means 69 containing a charge of liquid ammonia 71, check valves 70A, 70B, 70C and 70D, and preferably vapor regenerators 72A, 72B, 72C and 72D, and auxiliary heat exchanger 73. Briefly stated, and understood by one skilled in the art, in operation desorbed high temperature, high pressure ammonia from one or more but not all of compressors 45A, 45B, 45C and 45D, flows through vapor regenerators 72A, 72B, 72C and 72D, through check valves 66A, 66B, 66C and 66D to condenser 67 whereupon heat is rejected from condenser 67 to a low temperature heat sink such as the environment, as indicated by arrow 74, and the gaseous ammonia is condensed to form a low temperature, high pressure liquid. The ammonia liquid is further cooled in auxiliary heat exchanger 73 and then expanded through Joule-Thomson valve 68 to form a low temperature, low pressure liquid, which is collected in evaporator means 69. A low temperature heat load, as indicated by arrow 75, vaporizes the liquid ammonia 61 to form a low temperature, low pressure ammonia gas. The low temperature, low pressure ammonia gas flows through one or more but not all of check valves 70A, 70B, 70C and 70D into compressors 45A, 45B, 45C and 45D.

In all the circuits described herein the check valves open and close automatically whenever the pressure on the upstream side of the valve is greater than the pressure on the downstream side of the valve.

With regard to the system shown in FIG. 2, estimated temperatures at various times during the cycle are listed in Table 1 along with indicated flow direction of the heat transfer fluid through reversible pump 38, the opened solenoid valve in each of valve sets 30, 44, and 47, and comment on the canisters and compressors conditions. The location of temperature points T1 to T7 are shown on FIG. 3. Points T1, T2, T3 and T4 are fixed, while points T5, T8 and T7 are located proximate the compressor corresponding to the opened solenoid valve of valve set 30. For example, if valve 30C is open, temperatures T5–T7 refer to the temperature of points proximate to compressor 45C. In this particular embodiment, referring to FIGS. 1 and 2, it is assumed that the bath heat transfer medium is maintained at 225° C., radiator 51 cools the heat transfer fluid to 40° C., chemisorbents 34A and 34B are $MgCl_2$ and the canister pressure range is from 5 to 15 bar, physisorbents 50A–D are carbon and the compressor pressure range is also from 5 to 15 bar, and the working fluid for both the higher and lower temperature circuits is ammonia. As can be seen from Table 1, for this embodiment, the maximum temperature reached in the physisorption compressors is between the maximum and minimum operating temperatures of the chemisorption canisters.

Figure 3:
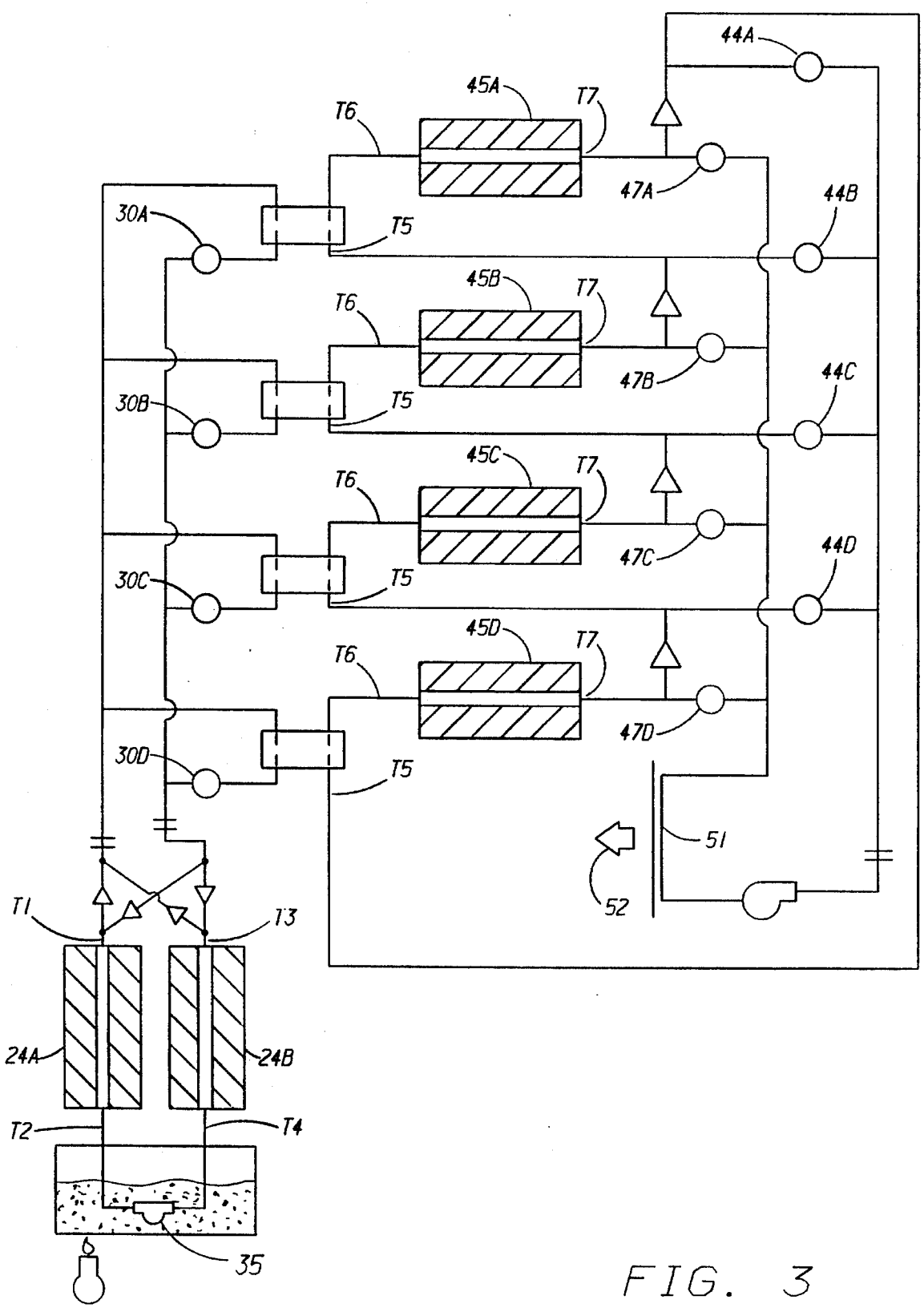
FIG. 3 is schematic flow diagram of FIG. 1 with designated points of temperature to be used with the discussion of Table 1.
Figure 4:
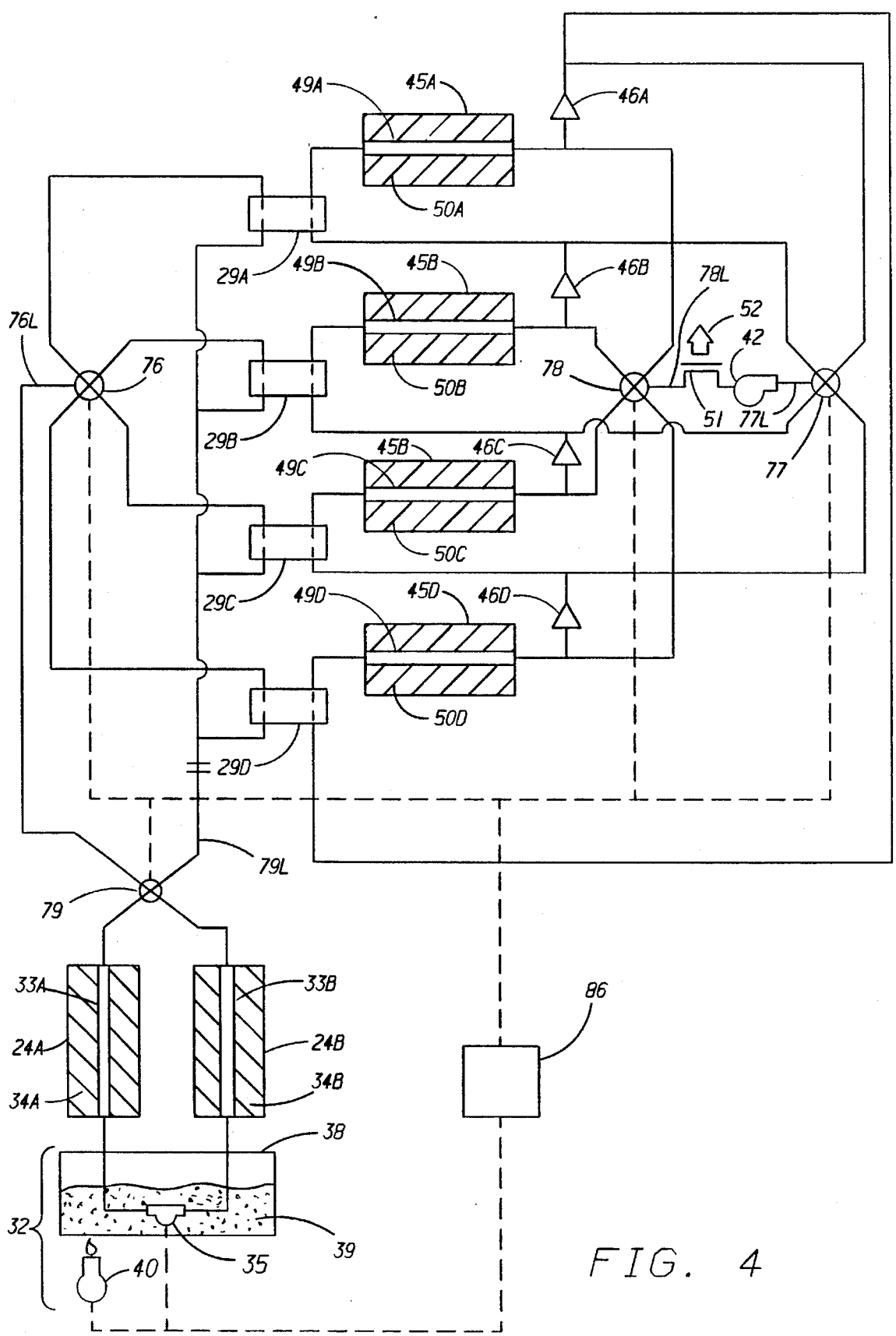
FIG. 4 is schematic flow diagram of the heat transfer circuit of a chemisorption circuit and a physisorption circuit of another embodiment of this invention.

FIG. 4 is a schematic flow diagram of another embodiment of the heat transfer fluid circuits of this invention in which solenoid valve sets 30, 44 and 47 of FIG. 2 are replaced with four-way solenoid valves 76, 77 and 78, respectively. If desired, check valves 25A–D can be replaced with multiple-way solenoid valve 79. Controller means 86 controls valves 76, 77 and 78 so that only one of the four inlet or outlet passages of each valve is in fluid communication with lines 76L, 77L and 78L, respectively. Controller means 86 further controls valve 79 so that heat transfer element 33A is in fluid communication with only one of lines 76L or 79L at a time, and heat transfer element 33B is in fluid communication with the other one of lines 76L or 79L at the same time. Controller means 86 opens the valves 76, 77, 78 and 79 for a predetermined period of time. Controller means 86 also controls reversible pump 35 so that the heat transfer fluid pumped therein flows in a first direction for a predetermined period of time, stops pumping for a predetermined period of time, or pumps in a reverse direction for a predetermined period of time. Controller means 86 further prevents heat cascading during the extended or bottoming part of any phase by stopping pump 35, and pumping the heat transfer fluid directly from pump 42 to a predetermined compressor and therefrom directly to radiator 51. Controller means 86 also controls external heating unit 40 so that heating of heat transfer medium 39 occurs only as need to maintain its temperature to a predetermined valve. Other than as mentioned above the operation of the system of FIG. 4 is similar to that described for FIGS. 1 to 3. Higher and lower temperature ammonia working fluid circuits 55 and 56 of FIG. 2 can also be used with the heat transfer fluid circuits of FIG. 4.

When the systems FIGS. 1 to 4 are operated, with ammonia-$MgCl_2$ as the working fluid-chemisorbent pair, with desorption at 220° C. and 15 bar, with adsorption at 180° C. and 5 bar, the chemisorbent system has a $COP_C$ of about 0.3; and with ammonia-carbon as the working fluid-physisorbent pair, with desorption at 175° C. and 15 bar, and with adsorption at 40° C. and 5 bar, the physisorbent system has a $COP_C$ of about 1.0; with a combined $COP_C$ of about 1.3.

Figure 5:
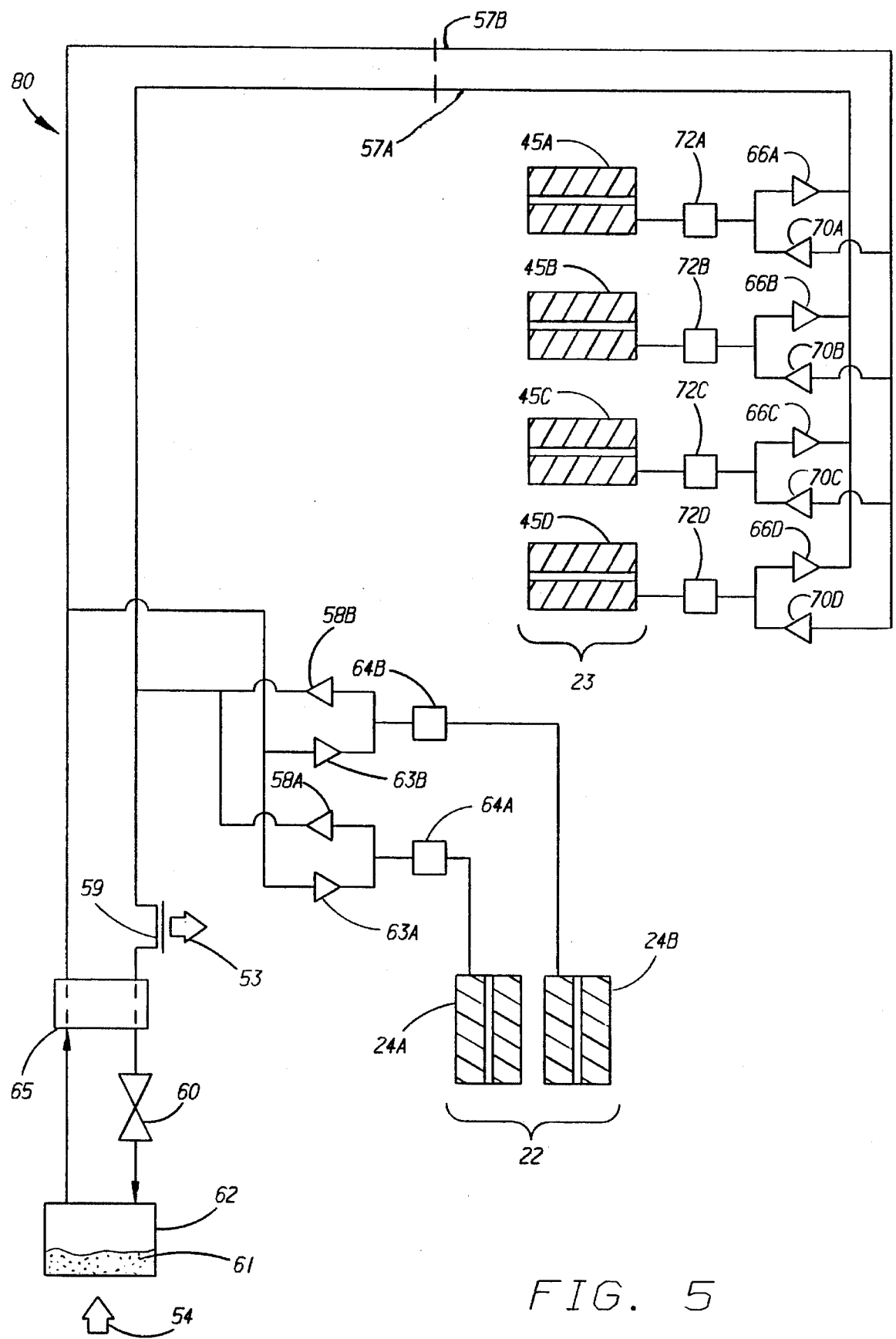
FIG. 5 is schematic flow diagram of a single working fluid circuit for the chemisorption side and a physisorption side for use with the heat transfer circuit of FIGS. 1 and 4.

FIG. 5 is another embodiment of the ammonia working fluid circuit of this invention, generally designated by numeral 80, in which higher temperature chemisorption circuit 22 and lower temperature physisorption circuit 23 share the same condenser 59, Joule-Thomson valve 60, evaporator means 62, ammonia source 61 and auxiliary heat exchanger 65. If desired, circuit 80 can be used as the ammonia circuit for the heat transfer circuits of FIGS. 1 and 4.

Figure 6:
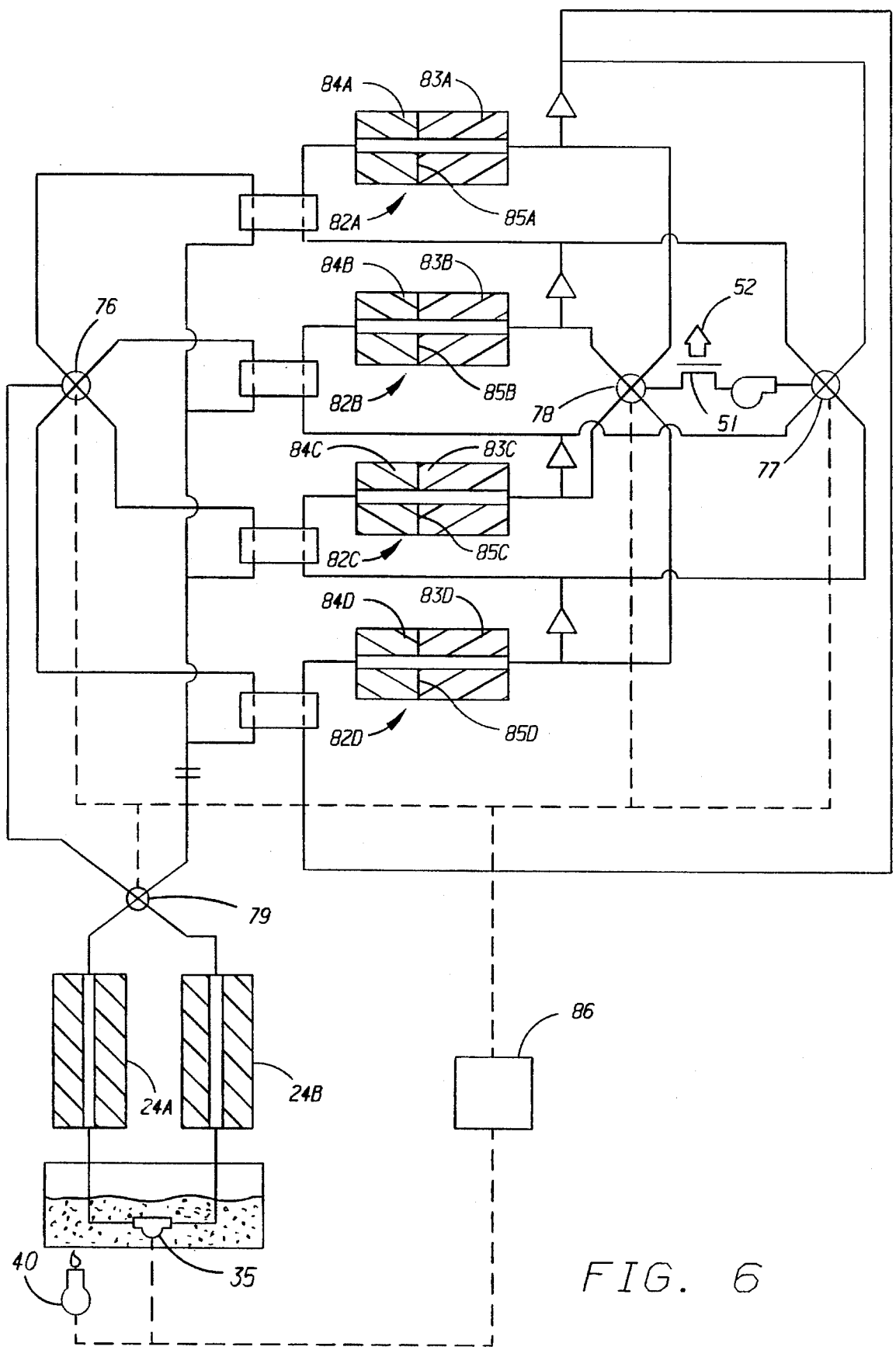
FIG. 6 is schematic flow diagram of the heat transfer circuit of a chemisorption circuit and a two stage physisorption circuit of still another embodiment of this invention.
Figure 7:
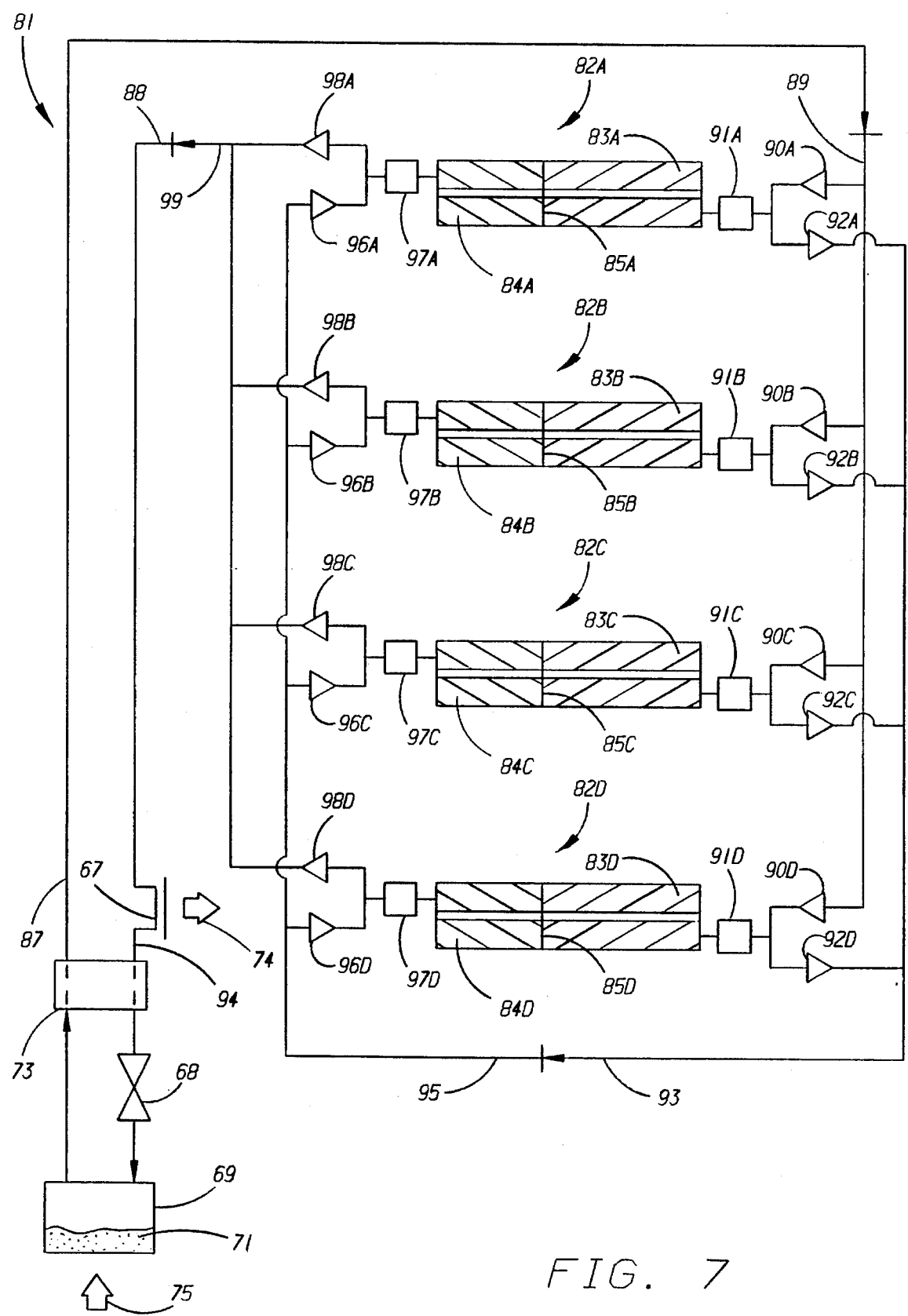
FIG. 7 is schematic flow diagram of a single working fluid circuit for a two stage physisorption side for use with the heat transfer circuit of FIG. 6.
Figure 8:
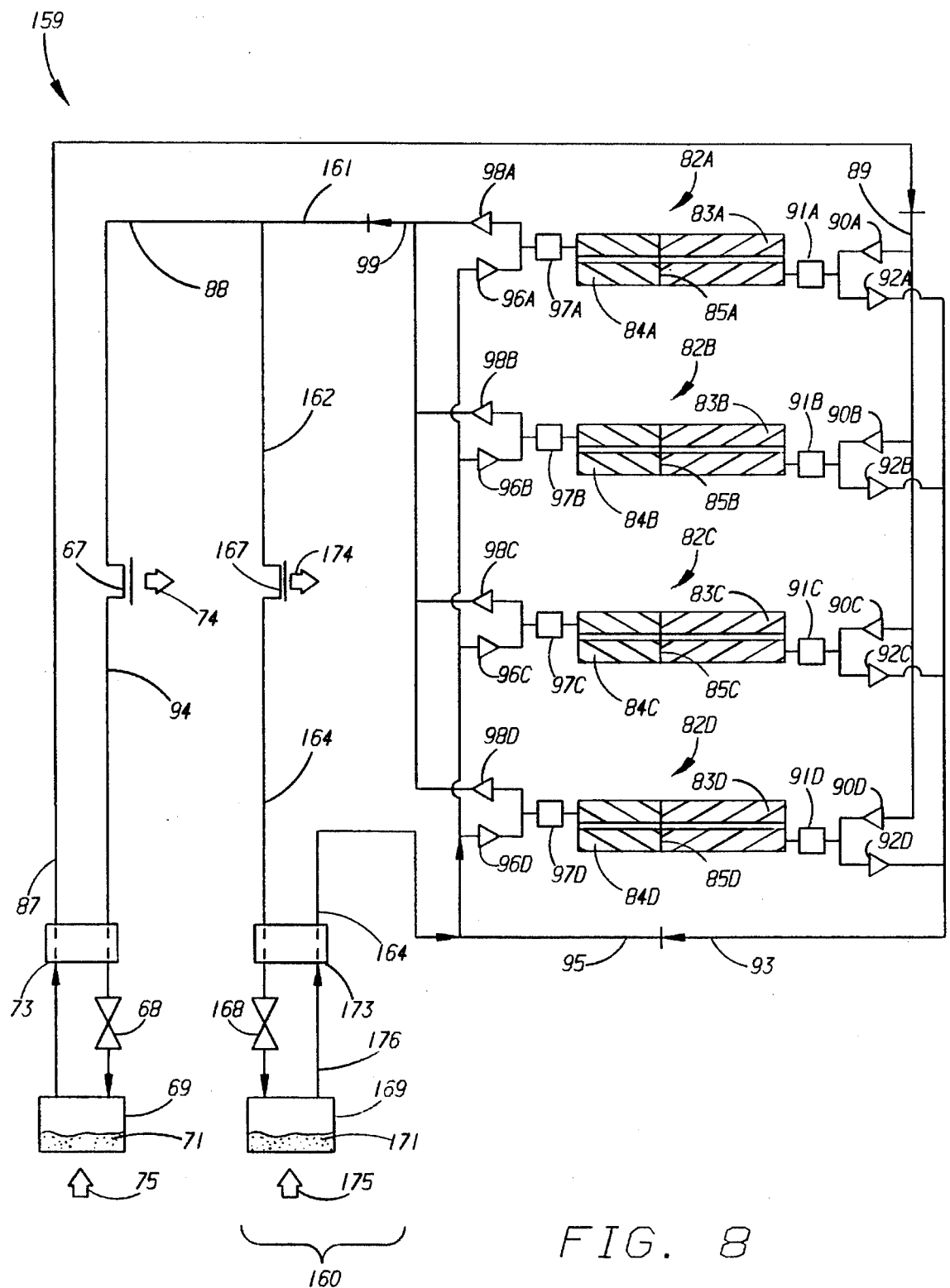
FIG. 8 is schematic flow diagram of another embodiment of this invention having two separate working fluid circuits for a two stage physisorption circuit for use with the heat transfer circuit of FIG. 6.

FIG. 6 is yet another embodiment of this invention, in which single stage compressors 45A–D of FIG.8 are replaced with two stage physisorption compressors 82A, 82B, 82C and 82D having first stage carbon physisorbents 83A, 83B, 83C and 83D, and second stage carbon physisorbents 84A, 84B, 84C and 84D, respectively, separated by non-permeable partition 85A, 85B, 85C and 85D, respectively. The operation of the heat transfer circuit of FIG. 6 is the same as that described for FIGS. 1, 3 and 4. The operation of the ammonia working fluid circuit for the higher temperature chemisorption circuit can be the same as that described and shown for circuit 55 of FIG. 2, however, the operation of the ammonia working fluid circuit for the lower temperature physisorption circuit is not the same as that described and shown for circuit 56 of FIG. 2 but rather is illustrated in FIG. 7.

FIG. 7, shows a schematic flow diagram for the ammonia circuit of a two stage compression regenerative heat pump process, generally designated by numeral 81. For ease of illustration, only the ammonia working fluid circuit for the lower temperature physisorption circuit is shown in FIG. 7. As can be seen the circuit has four first stage compression zones containing carbon physisorbents 83A, 83B, 83C and 83D, and four second stage compression zones containing carbon physisorbents 84A, 84B, 84C and 84D.

A quantity of ammonia 71, as the working fluid, contained in evaporator 69 is vaporized at a low pressure and conveyed through line 87. Line 87 is in heat transfer communication with line 94 in auxiliary heat exchanger 73. Line 87, which is connected to the inlet of manifold 89, the outlets of which are connected to first stage inlet check valves 90A, 90B, 90C and 90D, which are connected to vapor regenerators 91A, 91B, 91C and 91D, respectively, which are in fluid communication with first stage compression zone carbon physisorbent 83A, 83B, 83C and 83D, respectively.

First stage compression zone carbon physisorbents 83A, 83B, 83C and 83D, and second stage compression zone carbon physisorbents 84A, 84B, 84C and 84D, respectively, are separated by partitions 85A, 85B, 85C and 85D, respectively, and housed in compressors 82A, 82B, 82C and 82D, respectively. Each partition prevents direct fluid communication between the first stage and second stage compression zones within the compressor.

Vapor regenerators 91A, 91B, 91C and 91D are also connected to first stage outlet check valves 92A, 92B, 92C and 92D, respectively, which are connected to the inlets of manifold 93, the outlet of which is connected to the inlet of manifold 95, the outlets of which are connected to second stage inlet check valves 96A, 96B, 96C and 96D, which are connected to vapor regenerators 97A, 97B, 97C and 97D, respectively, which are in fluid communication with second stage compression zone carbon physisorbents 84A, 84B, 84C and 84D, respectively.

Vapor regenerators 97A, 97B, 97C and 97D are also connected to second stage outlet check valves 98A, 98B, 98C and 98D, respectively, which are connected to the inlets of manifold 99, the outlet of which is connected to condenser 67, which is connected to line 94. Line 94 is connected to expansion valve 68, which is connected to evaporator 69, thereby forming a closed ammonia working fluid loop. Solenoid valves 76, 77, 78 and 79, pump 35 and external heat source 40 are controlled by controller 86 in the same manner as described for FIG. 4.

When the system of FIGS. 6 and 7 is operated, with ammonia-$MgCl_2$ as the working fluid-chemisorbent pair, with desorption at 220° C. and 15 bar, with adsorption at 180° C. and 5 bar, the chemisorbent system has a $COP_C$ of about 0.3; and with ammonia-carbon as the working fluid-physisorbent pair in both physisorption stages, with desorption at 175° C. and 15 bar in the second stage, and with adsorption at 40° C. and 5 bar in the first stage, the physisorbent system has a $COP_C$ of about 1.2; with a combined $COP_C$ of about 1.5.

FIG. 7 shows only the ammonia physisorption circuit. The ammonia chemisorption circuit to be used with FIG. 7 is not shown in FIG. 7. In one embodiment, the chemisorption circuit and the physisorption circuit can share the same ammonia vapor recovery section as shown in FIG. 5 where the chemisorbent canisters and the physisorption compressors share the same condenser and evaporator means. In another embodiment the chemisorption circuit and the physisorption circuit can be independent as shown in FIG. 2 where the chemisorbent canisters and the physisorption compressors each have their own condenser and evaporator means.

FIG. 8 is a schematic diagram of another embodiment of this invention, generally designated by numeral 159, showing the working fluid circuit for a two stage compression series/series regenerative heat pump process for cooling a refrigeration space and a freezer space. FIG. 8 also has four first stage and four second stage compression zones. The working fluid circuit for the system of FIG. 8 is the same as that for the system of FIG. 7 except for the addition of second evaporator circuit 160. As shown in FIG. 8, branching off of line 161 is line 162, which is connected to condenser 167, which is connected to line 164, which is in heat transfer communication with line 176 in auxiliary heat exchanger 173, which is connected to Joule-Thomson expansion valve 168, which is connected to evaporator 169.

Evaporator 169, which contains a supply of liquid ammonia 171, receives heat from a refrigerator zone, as indicated by arrow 175, thereby cooling the refrigerator zone. Ammonia vapor flows from evaporator 169 to line 176, which is connected to manifold 95, which delivers ammonia vapor to the second stage compression zones at an intermediate pressure, thereby forming a second closed working fluid loop.

Evaporator means 69 receives heat from a freezer zone, as indicated by arrow 75, thereby cooling the freezer zone.

The heat transfer fluid circuit for the system of FIG. 8 is the same as that for the system of FIG. 7, namely that shown in FIG. 6.

Evaporator means 89 produces ammonia gas at about $-18°$ C. and about 2 bar. Evaporator means 169 produces ammonia gas at about $+5°$ C. and about 5 bar. Condensers 74 and 174 cool the ammonia gas and produce a condensate at about $38°$ C. and about 15 bar.

FIG. 8 shows only the ammonia physisorption circuit. The ammonia chemisorption circuit to be used with FIG. 8 is not shown in FIG. 8. In one embodiment, the chemisorption circuit and the portion of the ammonia vapor recovery physisorption circuit downstream of the upper stage physisorption compressor, i.e. line 88, and the upstream of the lower stage physisorption compressor, i.e. line 87 can share the same ammonia vapor recovery section. In other words condenser 67 and evaporator means 69 of FIG. 8 can be deleted and lines 87 and 88 of FIG. 8 can be connected to lines 57B and 57A, respectively, of FIG. 5, and condenser 59 and evaporator means 62 used instead. In another embodiment the ammonia vapor recovery circuit for the chemisorption circuit and the physisorption circuit can be independent as shown in FIG. 2 where the chemisorbent canisters have their own condenser and evaporator means.

Figure 9:
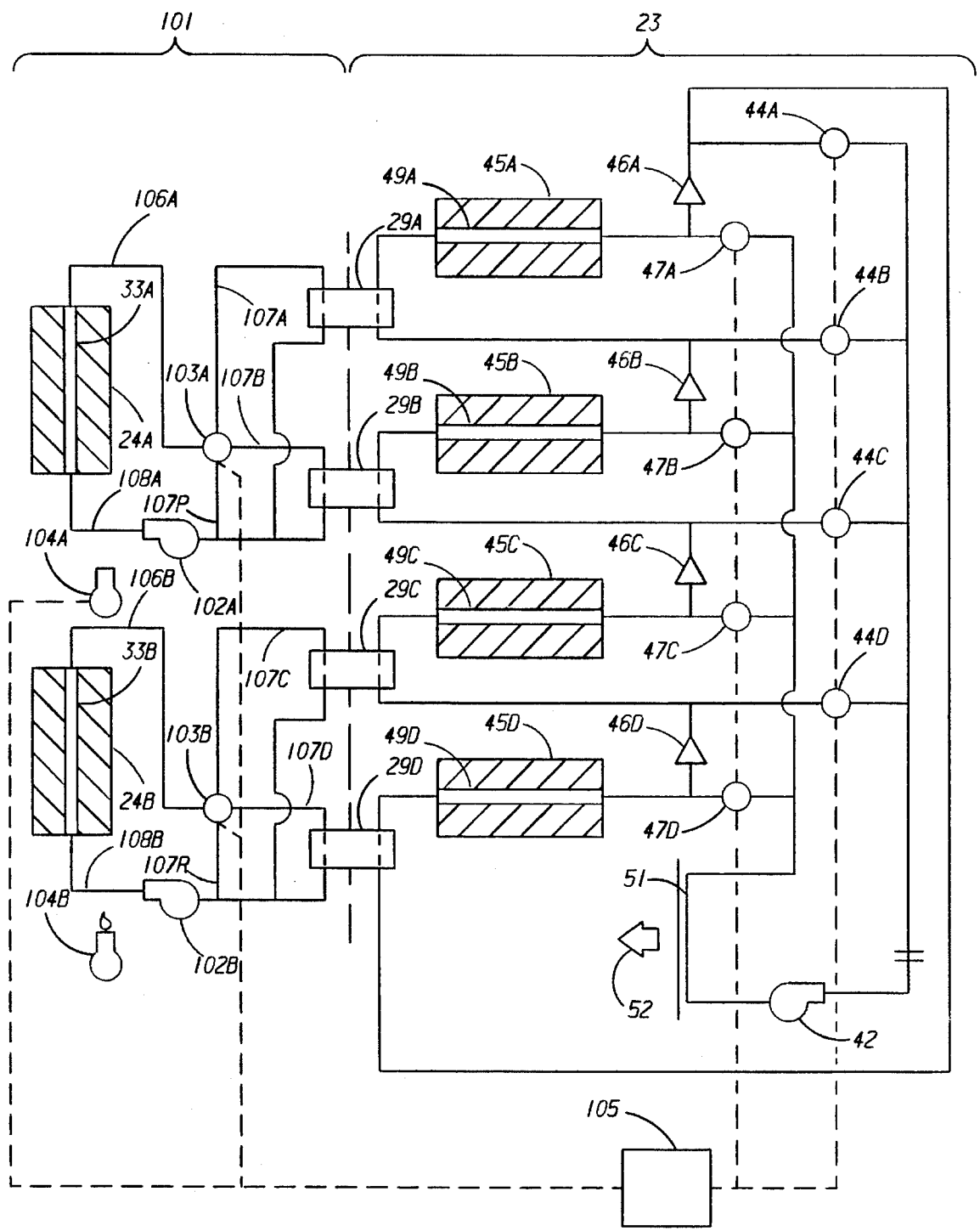
FIG. 9 is schematic flow diagram of the heat transfer circuit of a chemisorption circuit and a physisorption circuit of yet another embodiment of this invention.

FIG. 9 is another embodiment of this invention in which heat transfer fluid circuit 23 of the lower temperature physisorption side is the same as that shown in FIG. 1, but single heat transfer fluid circuit 22 of FIG. 1 is replaced with two separate heat transfer fluid loops, generally designated collectively by numeral 101, each having its own pump, external heat source, and four-way solenoid valve. In operation flow from pump 102A is directed through heat transfer element 33A in canister 24A to four-way solenoid valve 103A which directs the heat transfer fluid to either heat exchanger 29A or 29B, or directly back to pump 102A. External heat source 104A is turned on when canister 24A is to be heated. In a similar manner, flow from pump 102B is directed through heat transfer element 33B in canister 24B to four-way solenoid valve 103B which directs the heat transfer fluid to either heat exchanger 29C or 29D, or directly back to pump 102B. External heat source 104B is turned on when canister 24B is to be heated.

Referring to FIG. 9, solenoid valves 44A, 44B, 44C and 44D, 47A, 47B, 47C, 47D, 103A and 103B are controlled by controller means 105 so that only one valve of valve set 44 is open, and only one valve of valve set 47 is open, so that inlet line 108A is in fluid communication with the only one of outlet lines 107A, 107B or 107P, so that inlet line 108B is in fluid communication with the only one of outlet lines 107C, 107D or 107R, for a predetermined period of time during the base part and bottoming part of each phase. Controller means 105 further prevents heat cascading during the bottoming part of each phase by stopping pump 102A and 102B, and pumping the heat transfer fluid directly from pump 42 to a predetermined compressor and therefrom directly to radiator 51. Controller means 105 also controls external heat sources 104A and 104B so that heating of heat transfer fluid in lines 108A and 108B occurs only as need to maintain the temperature of canisters 24A and 24B at a predetermined value.

When the system of FIG. 9 is operated, with $CoBr_2$ as the working fluid-chemisorbent pair, with desorption at $215°$ C. and 15 bar, with adsorption at $175°$ C. and 5 bar, the chemisorbent system has a $COP_C$ of about 0.35; and with ammonia-carbon as the working fluid-physisorbent pair, with desorption at $170°$ C. and 15 bar, and with adsorption at $40°$ C. and 5 bar, the physisorbent system has a $COP_C$ of about 1.0; with a combined $COP_C$ of about 1.35.

The operation of the heat transfer circuits for all of the above described embodiments illustrated in FIGS. 1 to 9 is determined by heat and ammonia sorption rates for the particular system in use and the cycling of the solenoid valves is control in a predetermined manner to achieve maximum efficiency for the system.

Figure 10:
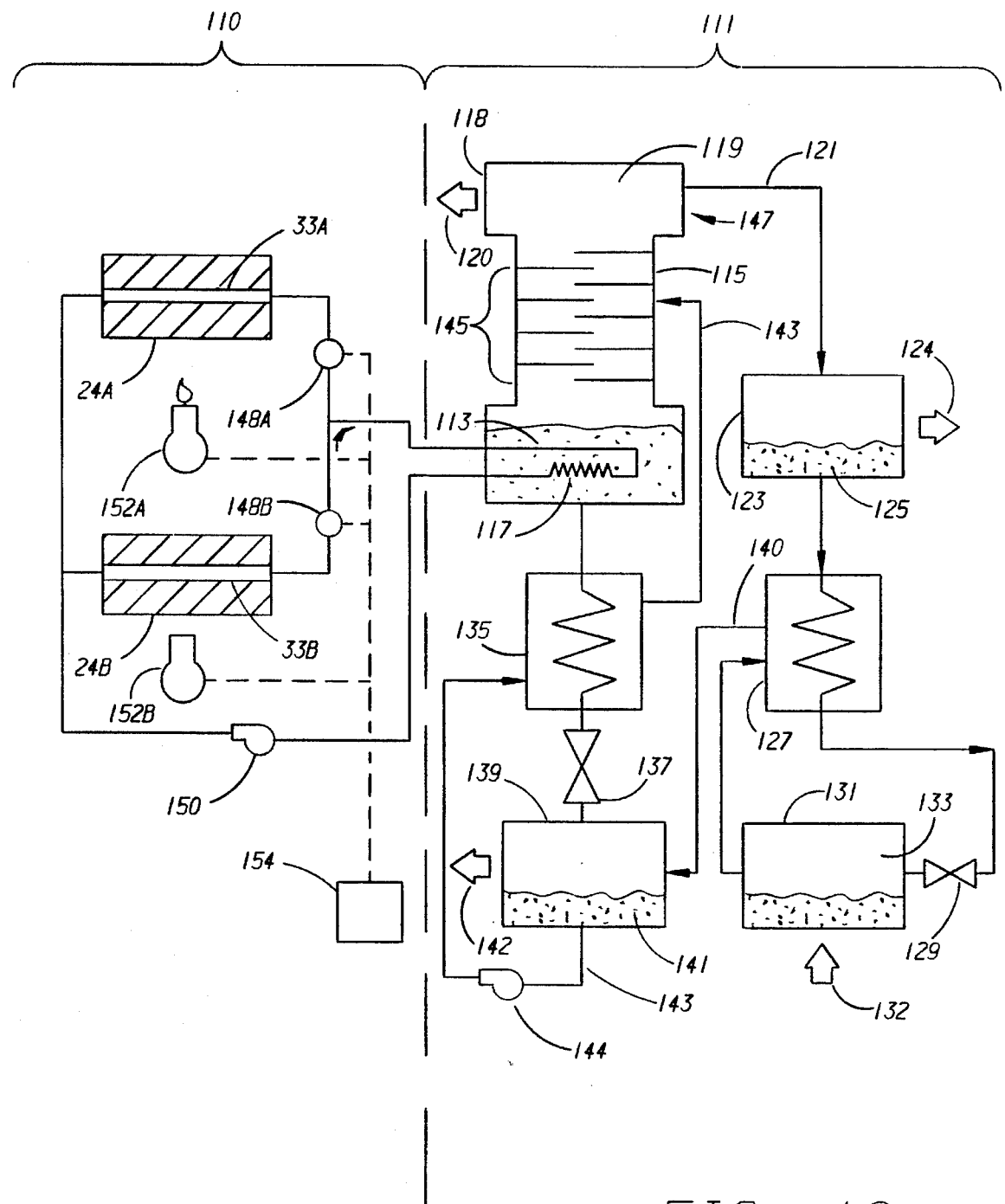
FIG. 10 is schematic flow diagram of the heat transfer circuit of a chemisorption circuit and a liquid absorption circuit of an embodiment of this invention.

FIG. 10 is a schematic flow diagram of one embodiment of this invention, of a heat transfer fluid circuit of a higher temperature chemisorption circuit, generally designated by numeral 110, powering a lower temperature absorber heat exchange (AHE) system, generally designated by numeral 111.

The heat transfer fluid circuit of higher temperature chemisorption circuit 110 comprises heat transfer elements 33A and 33B, solenoid valves 148A and 148B, pump 150, external heat sources 152A and 152B, and controller means 154. Means 154 controls the flow of heat transfer fluid through heat transfer elements 33A and 33B by opening and closing solenoid valves 148A and 148B for a predetermined period of time, respectively. Means 154 also control external heat sources 152A and 152B so that only one is actually heating its corresponding canister (24A or 24B) at a time. As shown in FIG. 10, canister 24A is being heated, solenoid valve 148B is open and 148A closed thereby directing hot heat transfer fluid from canister 24B to coil 117 in generator 115, to pump 150 and back to canister 24B. After a predetermined period of time the chemisorbent in canister 24A is desorbed a predetermined amount, external heat source 152A is turned off and 152B turned on, valve 148B is closed and 148A opened, and the process repeated in a similar manner for heating canister 24B.

In AHE system 111 ammonia-water solution 113 at about $116°$ C. and 15 bar in generator 115, is heated by waste heat provided by higher temperature heat transfer fluid loop of chemisorption circuit 110, and specifically by heating coil 117. Heat from rectifier section 147 of generator 115 is transferred to the environment by radiator 118 as indicated by arrow 120. Distilled and rectified high pressure ammonia vapor 119 at about 15 bar is removed from the generator through line 121 and charged to condenser 123 wherein the heat of condensation is transferred to the environment as indicated by arrow 124, and low temperature, high pressure ammonia condensate 125 at about $38°$ C. is formed. The liquid ammonia is cooled further in heat exchanger 127, expanded through Joule-Thomson valve 129, and charged to evaporator means 131 wherein the heat of evaporation is provided by low temperature heat load, such as an interior building space, as indicated by arrow 132, to vaporize the ammonia liquid and produce a low temperature, low pressure ammonia gas 133 at about $5°$ C. This gas is heated in heat exchanger 127 and then charged to absorber 139 through line 140. A stream of weak high pressure ammonia-water solution 113 from generator 115 is cooled in heat exchanger 135, expanded through Joule-Thomson valve 137, and charged to absorber 139 together with a stream of cooled, low pressure ammonia vapor conveyed by line 140 from heat exchanger 127. The ammonia vapor stream is absorbed by the weak ammonia-water solution stream in absorber 139 at about 38° C. to produce strong ammonia-water solution 141 which is collected in absorber 139, with the heat of absorption being exhausted to the environment as indicated by arrow 142. A stream of strong ammonia-water solution 143 is pumped by pump 144 at about 15 bar through heat exchanger 135 to distillation section 145 of generator 115 wherein ammonia is stripped from the solution at about 15 bar along with some water vapor. Most of the water vapor is separated from the ammonia vapor in rectifier section 147 with the separated water returning to distillation section 145 and the bottom section of generator 115, thereby completing the absorption-desorption cycle.

When the system of FIG. 10 is operated, with $SrBr_2$ as the working fluid-chemisorbent pair, with desorption at 160° C. and 15 bar, with chemisorption at 120° C. and 5 bar, the chemisorbent system has a $COP_C$ of about 0.35; and with AHE system 111 as the lower temperature circuit, with desorption in generator 115 at 115° C. and 15 bar, and with absorption in absorber 139 at 38° C. and 5 bar, the AHE system has a $COP_C$ of about 0.6; with a combined $COP_C$ of about 1.1.

Figure 11:
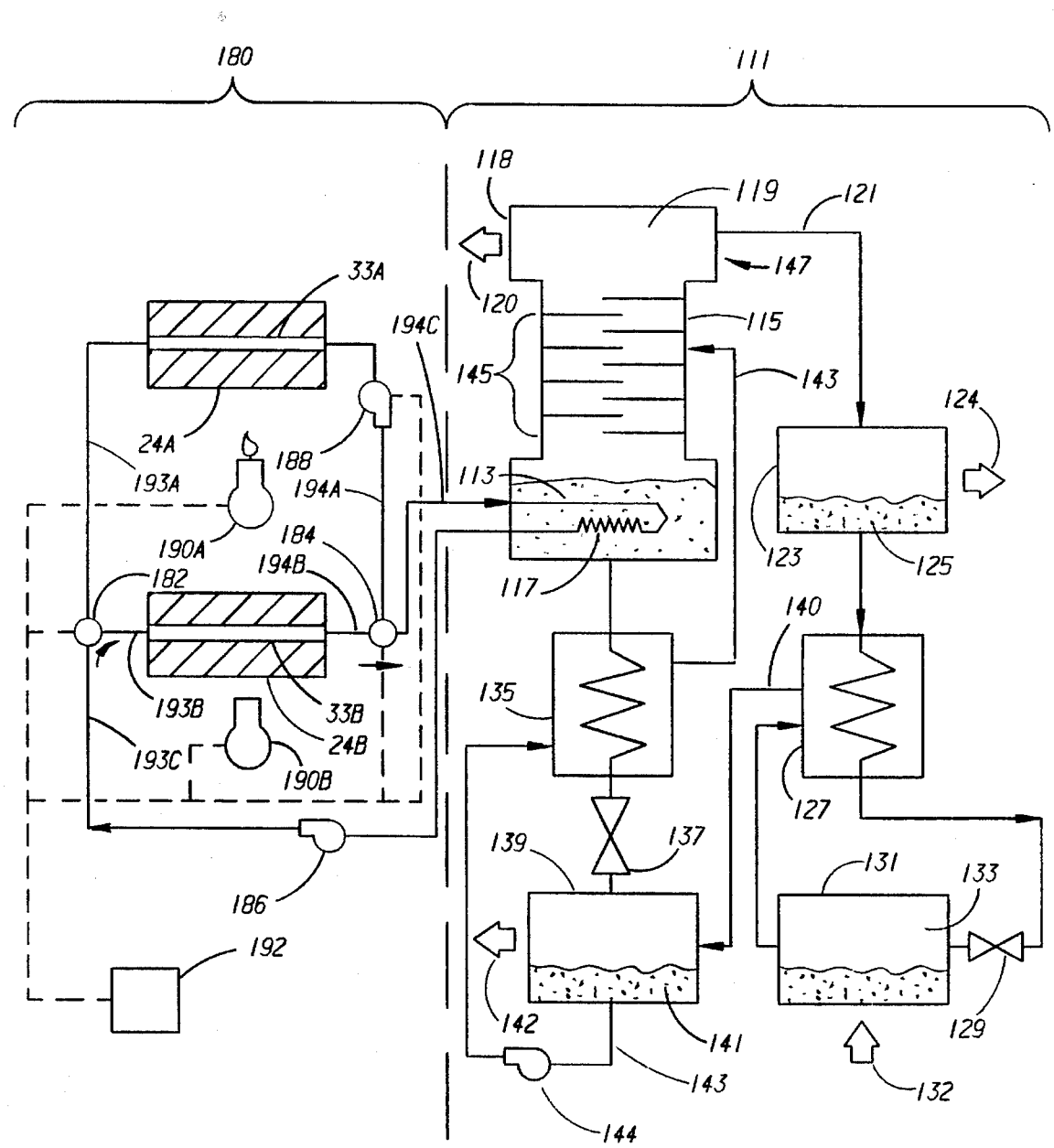
FIG. 11 is schematic flow diagram of the heat transfer circuit of a chemisorption circuit with heat regeneration during the chemisorption cycle and a liquid absorption circuit of an embodiment of this invention.

FIG. 11 is a schematic flow diagram of another embodiment of this invention similar in some respects to FIG. 10, of a heat transfer fluid circuit of a higher temperature chemisorption circuit, generally designated by numeral 180, powering a lower temperature absorber heat exchange (AHE) system, generally designated by numeral 111. In this embodiment, lower temperature AHE circuit 111 is the same as that described for FIG. 10.

The heat transfer fluid circuit of higher temperature chemisorption circuit 180 comprises heat transfer elements 33A and 33B, three-way solenoid valves 182 and 184, pumps 188 and 188, external heat sources 190A and 190B, and controller means 192. Means 192 controls the flow of heat transfer fluid through heat transfer elements 33A and 33B by directing flow through three-way solenoid valves 182 and 184 for predetermined periods of time, and activating pumps 188 and 188. Means 192 also control external heat sources 190A and 190B so that only one is actually heating its corresponding canister (24A or 24B) at a time.

In FIG. 11, while canister 24A is being heated by external heat source 190A, pumps 188 and 188 are activated, solenoid valve 182 is open to flow only from line 193C to 193A, solenoid valve 184 is open to flow only from line 194B to 194C, thereby directing hot heat transfer fluid from canister 24B to coil 117 in generator 115, to pump 188 and back to canister 24B. After a predetermined period of time the chemisorbent in canister 24A is desorbed a predetermined amount, external heat source 190A is turned off, pump 188 is deactivated, solenoid valve 182 is opened to flow only from line 193B to 193A, solenoid valve 184 is opened to flow only from line 194A to 194B, thereby directing hot heat transfer fluid from canister 24A to pump 188, to canister 24B and back to canister 24A. Heat is regenerated during this phase by transferring heat from hotter canister 24A to cooler canister 24B. After a predetermined period of time heat regeneration is completed and pump 188 is deactivated.

In the next phase, canister 24B is heated by external heat source 190B, pump 188 is activated, solenoid valve 182 is opened to flow only from line 193C to 193A, solenoid valve 184 is opened to flow only from line 194A to 194C, thereby directing hot heat transfer fluid from pump 188 to canister 24A, to coil 117 in generator 115 and back to pump 188. After a predetermined period of time the chemisorbent in canister 24B is desorbed a predetermined amount, the chemisorbent in canister 24A is absorbed a predetermined amount, external heat source 190B is turned off, solenoid valve 182 is opened to flow only from line 193B to 193A, and solenoid valve 184 is opened to flow only from line 194A to 194B, thereby directing hot heat transfer fluid from canister 24B, to canister 24A, to pump 188 and back to canister 24B. Heat is regenerated during this phase by transferring heat from hotter canister 24B to cooler canister 24A. After a predetermined period of time heat regeneration is completed and pump 188 is deactivated, thereby completing a cycle in higher temperature chemisorption circuit 180. The cycle is then repeated.

The operation of AHE system 111 is the same as described for FIG. 10.

It has been calculated that when the system of FIG. 11 is operated, with either ammonia-$CaBr_2$ or ammonia-$SrBr_2$ as the working fluid-chemisorbent pair, either with or without heat regeneration in higher temperature chemisorption circuit 180, with desorption at 15 bar, with chemisorption at 5 bar, the chemisorbent system will have a $COP_C$ ranging from about 0.40 to about 0.43; see Tables 2 to 5. Combined with AHE system 111 as the lower temperature circuit, with desorption in generator 115 at 15 bar, and with absorption in absorber 139 at 38° C. and 5 bar, with the AHE system having a $COP_C$ of about 0.6, the combined $COP_C$ will be from about 1.00 to about 1.03.

Tables 2 to 5 represent analytical computer calculations using a computer program designated RSORB, for two different choices of higher temperature chemisorbents of FIG. 11.

The input and output data of Table 2 correspond to chemisorbent 24A and 24B being $CaBr_2$ with no internal heat regeneration in the chemisorption circuit.

The input and output data of Table 3 correspond to chemisorbent 24A and 24B being $CaBr_2$ with internal heat regeneration in the chemisorption circuit.

The input and output data of Table 4 correspond to chemisorbent 24A and 24B being $SrBr_2$ with no internal heat regeneration in the chemisorption circuit.

The input and output data of Table 5 correspond to chemisorbent 24A and 24B being $SrBr_2$ with internal heat regeneration in the chemisorption circuit.

When the chemisorption circuit is operated with internal heat regeneration, as in Tables 3 and 5, each desorption step is required to be followed by a regeneration step which comprises circulating the heat transfer fluid through the loop comprising canister 24A and 24B and pump 188, during which external heat sources 190A and 190B are off. This heat regeneration step is omitted for the data presented in Tables 2 and 4.

The cooling coefficients of performance, or $COP_C$, for these four embodiments are generally seen to be from about 0.40 to about 0.43 or a specific power from about 2.50628 to about 2.31714 as shown in Tables 2 to 5.

Figure 12:
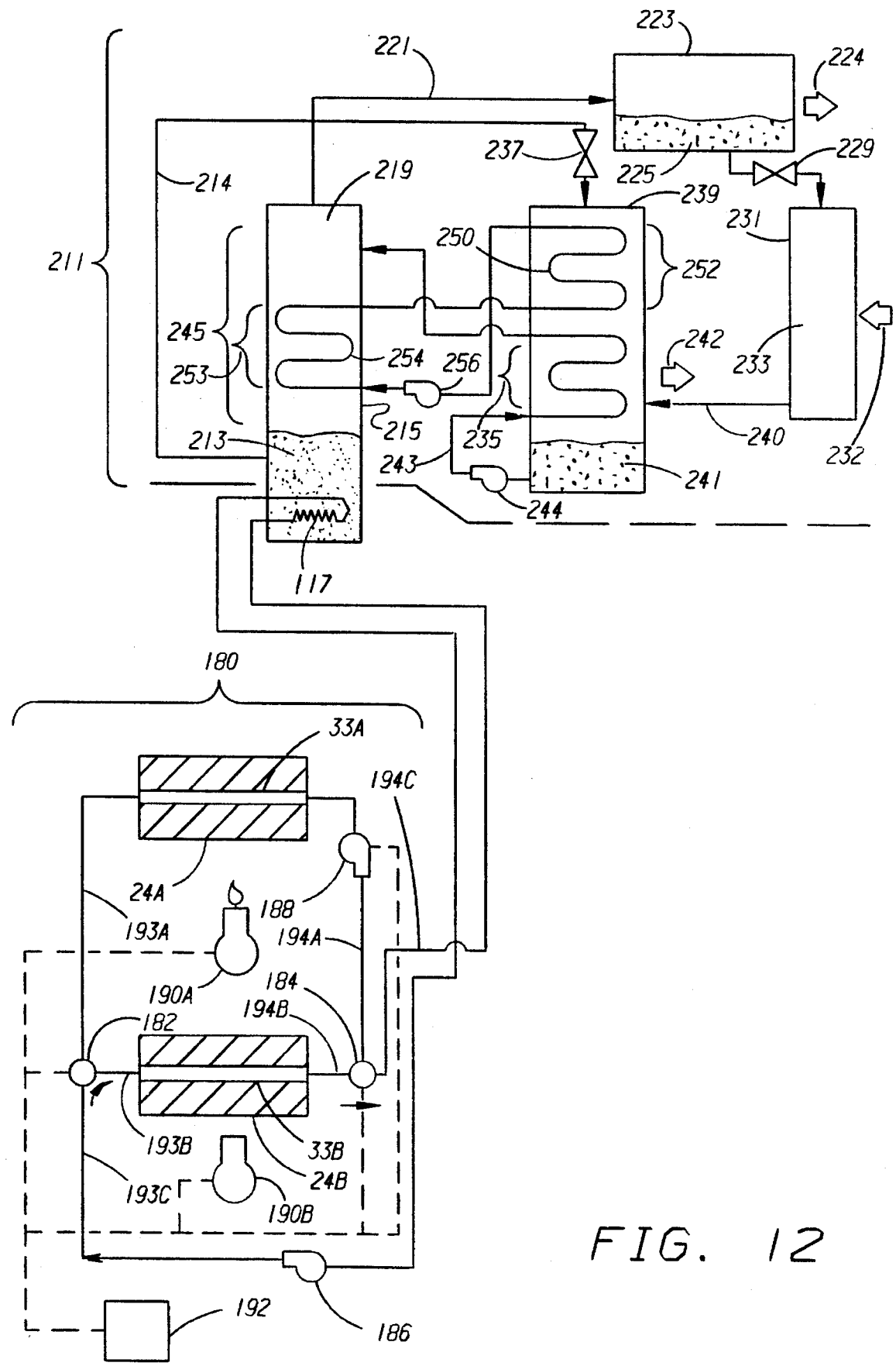
FIG. 12 is schematic flow diagram of the heat transfer circuit of a chemisorption circuit and liquid absorption circuit of another embodiment of this invention.

FIG. 12 is a schematic flow diagram of another embodiment of this invention, of a heat transfer fluid circuit of a higher temperature chemisorption circuit, generally designated by numeral 180, powering a lower temperature generator-absorber heat exchange (GAX) system, generally designated by numeral 211. The operation of higher temperature chemisorption circuit 180 is the same as that described for FIG. 11.

In lower temperature GAX system 211, a weak ammonia-water solution 213 in the bottom portion of generator 215, is heated by waste heat provided by higher temperature heat transfer fluid loop of chemisorption circuit 180, and specifically by heating coil 117, to produce ammonia vapor 219 at about 50° C. and about 15 bar. The high pressure ammonia vapor 219 flows from the generator through line 221 to condenser 223 wherein the gaseous ammonia stream is cooled and condensed, the heat of condensation transferred to the environment as indicated by arrow 224, and a low temperature, high pressure ammonia condensate 225 at about 40° C. and about 15 bar is formed. A stream of liquid ammonia from condenser 223 is expanded through Joule-Thomson valve 229 to produce low temperature, low pressure ammonia liquid 233 at about 4° C. and about 5 bar, which is then charged to evaporator means 231. A low temperature heat load, such as an interior building space, provides the heat of evaporation, as indicated by arrow 232, to vaporize the ammonia liquid in evaporator means 231 and produce low temperature, low pressure ammonia gas 233 at about 4° C. and about 5 bar, which is charged to absorber 239 through line 240.

A stream of weak high pressure ammonia-water solution 214 from generator 215 at about 150° C. and about 15 bar is expanded through Joule-Thomson valve 237, and charged to absorber 239 and contacted with the stream of low pressure ammonia vapor conveyed by line 240 from evaporator 231. The ammonia vapor stream is absorbed by the weak ammonia-water solution stream in absorber 239 to produce strong ammonia-water solution 241 which is col-lected in the bottom of absorber 239. A heat transfer fluid is pumped in a closed loop through heat exchange means 250 in heat exchange section 252 of absorber 239, and through heat exchange means 254 in heat exchange section 253 of generator 215. A portion of the heat of absorption is exhausted to the environment as indicated by arrow 242. Another portion of the heat of absorption is recovered by pumping a stream of strong ammonia-water solution 243 is pumped by pump 244 at about 40° C. and about 5 bar from the bottom section of absorber 239 through heat exchange section 235 of absorber 239, to section 245 of generator 215 wherein ammonia is stripped from the strong solution at about 150° C. and about 15 bar, thereby forming ammonia vapor stream 219 and weak ammonia-water solution 213 which is collected in the bottom section of generator 215, thereby completing the absorption-desorption cycle.

The operation of the heat transfer circuits for the embodiments illustrated in FIGS. 10 to 12 is determined by heat and ammonia sorption rates for the particular system in use, and is controlled in a predetermined manner by controllers 154 and 192 to achieve maximum efficiency for the system.

TABLE 1

| Time (min) | Temperature (°C.) at Point | | | | | | | Pump 35 Flow | Opened Solenoid Valve | | | Comment |
|---|---|---|---|---|---|---|---|---|---|---|---|---|
| | T1 | T2 | T3 | T4 | T5 | T6 | T7 | | 30 | 44 | 47 | |
| Phase 1 | | | | | | | | | | | | |
| 0 | 170 | 180 | 220 | 225 | | 175 | 75 | R–L | A | D | D | 45A being heated |
| 1 | 180 | 225 | 175 | 220 | 170 | 175 | 90 | R–L | A | D | D | 45A being heated |
| 2 | 220 | 225 | 170 | 180 | 165 | 215 | 175 | R–L | A | D | D | 24A & 45A desorbing, 24B sorbing |
| 2.01–3 | | | | | | | | Off | | D | C | 45C bottoming |
| Phase 2 | | | | | | | | | | | | |
| 3.01 | 220 | 225 | 170 | 180 | | 175 | 75 | L–R | D | C | C | 45D being heated |
| 4 | 175 | 220 | 180 | 225 | 170 | 175 | 90 | L–R | D | C | C | 45D being heated |
| 5 | 170 | 180 | 220 | 225 | 165 | 215 | 175 | L–R | D | C | C | 24B & 45D desorbing, 24A sorbing |
| 5.01–6 | | | | | | | | Off | | C | B | 45C bottoming |
| Phase 3 | | | | | | | | | | | | |
| 6.01 | 170 | 180 | 220 | 225 | | 175 | 75 | R–L | C | B | B | 45A being heated |
| 7 | 180 | 225 | 175 | 220 | 170 | 175 | 90 | R–L | C | B | B | 45A being heated |
| 8 | 220 | 225 | 170 | 180 | 165 | 215 | 175 | R–L | C | B | B | 24A & 45C desorbing, 24B sorbing |
| 8.01–9 | | | | | | | | Off | | B | A | 45C bottoming |
| Phase 4 | | | | | | | | | | | | |
| 9.01 | 220 | 225 | 170 | 180 | | 175 | 75 | L–R | B | A | A | 45A being heated |
| 10 | 175 | 220 | 180 | 225 | 170 | 175 | 90 | L–R | B | A | A | 45A being heated |
| 11 | 170 | 180 | 220 | 225 | 165 | 215 | 175 | L–R | B | A | A | 24B & 45B desorbing, 24B sorbing |
| 11.01–12 | | | | | | | | Off | | A | D | 45C bottoming |

R–L = Flow from right to left through pump 35 of FIG. 3
L–R = Flow from left to right through pump 35 of FIG. 3

TABLE 2

CaBr$_2$ AMMONIA CHEMISORPTION STAGE
NO INTERNAL HEAT REGENERATION

INPUTS

| | |
|---|---|
| JT temperature (K.) | 277.00000 |
| JT cooling load (W) | 10548.00000 |
| Effective ambient temperature (K.) | 200.00000 |
| Sorbent density (gm/cc) | 1.00000 |

TABLE 2-continued

CaBr₂ AMMONIA CHEMISORPTION STAGE
NO INTERNAL HEAT REGENERATION

| | |
|---|---|
| Void volume (%) | 70.00000 |
| Heat of formation (kcal/mol) | 10.51000 |
| Cp of sorbant with gas (cal/gm K) | 0.56300 |
| Sorbant low temperature (K.) | 404.00000 |
| Sorbant high temperature (K.) | 441.00000 |
| Sorbant low pressure (atm) | 5.00000 |
| Sorbant high pressure (atm) | 15.00000 |
| Delta (Mgas/Msorbant) | 0.22500 |
| Gas molecular weight | 17.00000 |
| Total cycle time to heat and cool (sec) | 360.00000 |
| Core density (gm/cc) | 2.71000 |
| Compressor case density (gm/cc) | 7.92000 |
| Core Cp (cal/gm K) | 0.24000 |
| Compressor case Cp (cal/gm K) | 0.12000 |
| Compressor case yield strength (ksi) | 100.00000 |
| Compressor ID (cm) | 5.00000 |
| Core volume (%) | 10.00000 |
| HX precooling temperature (K.) | 311.00000 |
| Low pressure enthalpy at precool (cal/gm) | 294.00000 |
| High pressure enthalpy at precool (cal/gm) | 0.00000 |
| HX efficiency (fraction) | 0.98000 |
| Low pressure gas cp in HX (cal/gm K) | 0.56000 |
| OUTPUTS | |
| Gas flow rate (gm/sec) | 8.58606 |
| Compressor case thickness with four fold safety (cm) | 0.02215 |
| Total compressor lengths (cm) | 788.39558 |
| Sorbent mass (kg) | 13.93213 |
| Metal core mass (kg) | 4.19512 |
| Metal case mass (kg) | 2.18196 |
| Total compressor mass (kg) | 20.30921 |
| Compressor radiator area (sq meters) | 20.68946 |
| Compressor radiator mass (kg) | 103.44730 |
| Sorbent and gas sensible heat (W) | 3372.19811 |
| Sorbent heat of formation (W) | 22518.49049 |
| Core heat required (W) | 432.95875 |
| Case heat required (W) | 112.59483 |
| Total heat required (W) | 26436.24218 |
| Specific power (W/W) = 1/COP$_c$ | 2.50628 |

TABLE 3

CaBr₂ AMMONIA CHEMISORPTION STAGE
WITH INTERNAL HEAT REGENERATION

INPUTS

| | |
|---|---|
| JT temperature (K.) | 277.00000 |
| JT cooling load (W) | 10548.00000 |
| Effective ambient temperature (K.) | 200.00000 |
| Sorbent density (gm/cc) | 1.00000 |
| Void volume (%) | 70.00000 |
| Heat of formation (kcal/mol) | 10.51000 |
| Cp of sorbent with gas (cal/gm K) | 0.32100 |
| Sorbent low temperature (K.) | 404.00000 |
| Sorbent high temperature (K.) | 441.00000 |
| Sorbent low pressure (atm) | 5.00000 |
| Sorbent high pressure (atm) | 15.00000 |
| Delta (Mgas/Msorbent) | 0.22500 |
| Gas molecular weight | 17.00000 |
| Total cycle time to heat and cool (sec) | 360.00000 |
| Core density (gm/cc) | 2.71000 |
| Compressor case density (gm/cc) | 7.92000 |
| Core Cp (cal/gm K) | 0.00000 |
| Compressor case Cp (cal/gm K) | 0.00000 |
| Compressor case yield strength (ksi) | 100.00000 |
| Compressor ID (cm) | 5.00000 |
| Core volume (%) | 10.00000 |
| HX precooling temperature (K.) | 311.00000 |
| Low pressure enthalpy at precool (cal/gm) | 294.00000 |
| High pressure enthalpy at precool (cal/gm) | 0.00000 |
| HX efficiency (fraction) | 0.98000 |

TABLE 3-continued

CaBr₂ AMMONIA CHEMISORPTION STAGE
WITH INTERNAL HEAT REGENERATION

| | |
|---|---|
| Low pressure gas Cp in HX (cal/gm K) | 0.56000 |
| OUTPUTS | |
| Gas flow rate (gm/sec) | 8.58606 |
| Compressor case thickness with four fold safety (cm) | 0.02215 |
| Total compressor lengths (cm) | 788.39558 |
| Sorbent mass (kg) | 13.93213 |
| Metal core mass (kg) | 4.19512 |
| Metal case mass (kg) | 2.18196 |
| Total compressor mass (kg) | 20.30921 |
| Compressor radiator area (sq meters) | 19.12809 |
| Compressor radiator mass (kg) | 95.64046 |
| Sorbent and gas sensible heat (W) | 1922.69200 |
| Sorbent heat of formation (W) | 22518.49049 |
| Core heat required (W) | 0.00000 |
| Case heat required (W) | 0.00000 |
| Total heat required (W) | 24441.18249 |
| Specific power (W/W), = 1/COP$_c$ | 2.31714 |

TABLE 4

SrBr₂ AMMONIA CHEMISORPTION STAGE
NO INTERNAL HEAT REGENERATION

INPUTS

| | |
|---|---|
| JT temperature (K.) | 277.00000 |
| JT cooling load (W) | 10548.00000 |
| Effective ambient temperature (K.) | 200.00000 |
| Sorbent density (gm/cc) | 1.26000 |
| Void volume (%) | 70.00000 |
| Heat of formation (kcal/mol) | 10.54000 |
| Cp of sorbent with gas (cal/gm K) | 0.57500 |
| Sorbent low temperature (K.) | 393.00000 |
| Sorbent high tmperature (K.) | 433.00000 |
| Sorbent low pressure (atm) | 5.00000 |
| Sorbent high pressure (atm) | 15.00000 |
| Delta (Mgas/Msorbent) | 0.26600 |
| Gas molecular weight | 17.00000 |
| Total cycle time to heat and cool (sec) | 360.00000 |
| Core density (gm/cc) | 2.71000 |
| Compressor case density (gm/cc) | 7.92000 |
| Core Cp (cal/gm K) | 0.24000 |
| Compressor case Cp (cal/gm K) | 0.12000 |
| Compressor case yield strength (ksi) | 100.00000 |
| Compressor ID (cm) | 5.00000 |
| Core volume (%) | 10.00000 |
| HX precooling temperature (K.) | 311.00000 |
| Low pressure enthalpy at precool (cal/gm) | 294.00000 |
| High pressure enthalpy at precool (cal/gm) | 0.00000 |
| HX efficiency (fraction) | 0.98000 |
| Low pressure gas Cp in HX (cal/gm K) | 0.56000 |
| OUTPUTS | |
| Gas flow rate (gm/sec) | 8.58606 |
| Compressor case thickness with four fold safety (cm) | 0.02215 |
| Total compressor lengths (cm) | 526.88089 |
| Sorbent mass (kg) | 11.73158 |
| Metal core mass (kg) | 2.80358 |
| Metal case mass (kg) | 1.45819 |
| Total compressor mass (kg) | 15.99335 |
| Compressor radiator area (sq meters) | 22.90356 |
| Compressor radiator mass (kg) | 114.51781 |
| Sorbent and gas sensible heat (W) | 3135.23145 |
| Sorbent heat of formation (W) | 22480.97263 |
| Core heat required (W) | 312.80454 |
| Case heat required (W) | 81.34765 |
| Total heat required (W) | 26010.35626 |
| Specific power (W/W) = 1/COP$_c$ | 2.46590 |

TABLE 5

SrBr$_2$ AMMONIA CHEMISORPTION STAGE WITH INTERNAL HEAT REGENERATION

INPUTS

| | |
|---|---:|
| JT temperature (K.) | 277.00000 |
| JT cooling load (W) | 10548.00000 |
| Effective ambient temperature (K.) | 200.00000 |
| Sorbent density (gm/cc) | 1.26000 |
| Void volume (%) | 70.00000 |
| Heat of formation (kcal/mol) | 10.54000 |
| Cp of sorbent with gas (cal/gm K) | 0.37400 |
| Sorbent low temperature (K.) | 393.00000 |
| Sorbent high temperature (K.) | 433.00000 |
| Sorbent low pressure (atm) | 5.00000 |
| Sorbent high pressure (atm) | 15.00000 |
| Delta (Mgas/Msorbent) | 0.26600 |
| Gas molecular weight | 17.00000 |
| Total cycle time to heat and cool (sec) | 360.00000 |
| Core density (gm/cc) | 2.71000 |
| Compressor case density (gm/cc) | 7.92000 |
| Core Cp (cal/gm K) | 0.00000 |
| Compressor case Cp (cal/gm K) | 0.00000 |
| Compressor case yield strength (ksi) | 100.00000 |
| Compressor ID (cm) | 5.00000 |
| Core volume (%) | 10.00000 |
| HX precooling temperature (K.) | 311.00000 |
| Low pressure enthalpy at precool (cal/gm) | 294.00000 |
| High pressure enthalpy at precool (cal/gm) | 0.00000 |
| HX efficiency (fraction) | 0.98000 |
| Low pressure gas Cp in HX (cal/gm K) | 0.56000 |

OUTPUTS

| | |
|---|---:|
| Gas flow rate (gm/sec) | 8.58606 |
| Compressor case thickness with four fold safety (cm) | 0.02215 |
| Total compressor lengths (cm) | 526.88089 |
| Sorbent mass (kg) | 11.73158 |
| Metal core mass (kg) | 2.80358 |
| Metal case mass (kg) | 1.45819 |
| Total compressor mass (kg) | 15.99335 |
| Compressor radiator area (sq meters) | 21.59143 |
| Compressor radiator mass (kg) | 107.95714 |
| Sorbent and gas sensible heat (W) | 2039.26359 |
| Sorbent heat of formation (W) | 22480.97263 |
| Core heat required (W) | 0.00000 |
| Case heat required (W) | 0.00000 |
| Total heat required (W) | 24520.23621 |
| Specific power (W/W) = 1/COP$_c$ | 2.32463 |

What is claimed is:

1. A heat cascading regenerative sorption heat pump process with rejected heat from a higher temperature chemisorption circuit powering a lower temperature physical adsorption circuit, the process comprising:

(a) providing a higher temperature ammonia chemisorption circuit containing ammonia and a chemisorbent, the chemisorbent having a first chemical composition operable for chemisorbing and desorbing ammonia, the higher temperature ammonia chemisorption circuit comprising a plurality of canisters each containing the chemisorbent, first condensing means, first evaporating means for cooling a low temperature heat load, first heating means for heating the chemisorbent to a first upper temperature for desorption of ammonia, and first cooling means for cooling the chemisorbent, operatively connected together, and wherein each canister has a heat transfer element in thermal communication with, but not in fluid communication with the chemisorbent;

(b) providing a lower temperature ammonia physical adsorption circuit containing ammonia and a physical adsorbent, the physical adsorbent having a second chemical composition operable for physically adsorbing and desorbing ammonia, the second chemical composition being different than the first chemical composition, the lower temperature ammonia physical adsorption circuit comprising adsorption/desorption means containing the physical adsorbent, the adsorption/desorption means having a first part for desorbing ammonia and a second part for physically adsorbing ammonia, second condensing means, second evaporating means for cooling a low temperature heat load, second heating means for heating the first part of the adsorption/desorption means and the physical adsorbent therein to a second upper temperature for desorption of ammonia, and second cooling means for rejecting heat therefrom, operatively connected together;

providing at least one first closed heat transfer circuit containing a first heat transfer liquid, the first heat transfer liquid being different than the chemisorbent, the physical adsorbent and ammonia, the first closed heat transfer circuit comprising the heat transfer element of at least one canister, and heat exchange means in thermal communication with the first part of the adsorption/desorption means but not in fluid communication with the physical adsorbent; and (d) wherein cooling the chemisorbent by the first cooling means is by flowing the first heat transfer liquid through the heat transfer element of the at least one canister, thereby cooling it,
wherein heating the first part of the adsorption/desorption means and the physical adsorbent therein by the second heating means to a second upper temperature for desorption of ammonia is by flowing the first heat transfer liquid from the at least one canister through the heat exchange means thereby heating the first part, and thereby cascading heat from the higher temperature ammonia chemisorption circuit to the lower temperature ammonia physical adsorption circuit; and (e) regenerating heat within the adsorption/desorption means by transferring heat from the first part thereof to the second part thereof.

2. The process of claim 1, wherein the first heating means for heating the chemisorbent to a first upper temperature for desorption of ammonia provides the entire net heat added to the process.

3. The process of claim 1, wherein the second cooling means for rejecting heat from the lower temperature ammonia physical adsorption circuit is by transferring heat from the second part of the adsorption/desorption means to a third low temperature heat sink, thereby cooling the second part of the adsorption/desorption means.

4. The process of claim 1, wherein the chemisorbent is selected from the group consisting of MgCl$_2$, CaBr$_2$, SrBr$_2$, and CoBr$_2$, and solid inorganic ammoniated complex compounds, and wherein the physical adsorbent is selected from the group consisting of activated carbon, zeolite, alumina and silica gel.

5. A heat cascading regenerative sorption heat pump process with rejected heat from a higher temperature chemisorption circuit powering a lower temperature physical adsorption circuit, the process comprising:

(a) providing a higher temperature ammonia chemisorption circuit containing ammonia and a chemisorbent therefor, the higher temperature ammonia chemisorption circuit comprising
a plurality of canisters, each containing the chemisorbent, the chemisorbent having a first chemical composition operable for chemisorbing and desorbing ammonia, first heating means for heating each canister, first condensing means for transferring heat from ammonia gas to a first low temperature heat sink, and for condensing ammonia gas, and first evaporating means for evaporating ammonia liquid and forming ammonia gas;

(b) heating, with the first heating means, at least one canister to a first upper temperature and desorbing ammonia from the chemisorbent therein, thereby producing a first desorbed high temperature, high pressure ammonia gas;

(c) removing the first desorbed high temperature, high pressure ammonia gas from the at least one canister, and automatically limiting ammonia gas flow in an exiting direction therefrom;

(d) condensing the first desorbed high temperature, high pressure ammonia gas in the first condensing means thereby forming a first low temperature, high pressure ammonia liquid;

(e) converting the first low temperature, high pressure ammonia liquid to a first low temperature, low pressure ammonia liquid;

(f) evaporating the first low temperature, low pressure ammonia liquid in the first evaporating means and forming a first low temperature, low pressure ammonia gas by transferring heat from a first low temperature heat load to the first evaporating means thereby cooling the first low temperature heat load;

(g) transferring the first low temperature, low pressure ammonia gas from the first evaporating means to at least one other canister operating at a first lower temperature which is lower than the first upper temperature and chemisorbing ammonia with the chemisorbent therein, and automatically limiting ammonia gas flow in an entering direction thereto;

(h) providing a lower temperature ammonia physical adsorption circuit containing ammonia and a physical adsorbent therefor, the lower temperature ammonia physical adsorption circuit comprising adsorption/desorption means containing the physical adsorbent, the physical adsorbent having a second chemical composition operable for physically adsorbing and desorbing ammonia, the second chemical composition being different than the first chemical composition, second condensing means for transferring heat from ammonia gas to a second low temperature heat sink and for condensing ammonia gas, and second evaporating means for evaporating ammonia liquid and forming ammonia gas;

(i) heating a first part of the adsorption/desorption means to a second upper temperature and desorbing ammonia from the physical adsorbent therein, thereby producing a second desorbed high temperature, high pressure ammonia gas, the second upper temperature being lower than the first upper temperature;

(j) removing the second desorbed high temperature, high pressure ammonia gas from the first part of the adsorption/desorption means, and automatically limiting flow in an exiting direction therefrom;

(k) condensing the second desorbed high temperature, high pressure ammonia gas in the second condensing means thereby forming a second low temperature, high pressure ammonia liquid;

(l) converting the second low temperature, high pressure ammonia liquid to a second low temperature, low pressure ammonia liquid;

(m) evaporating the second low temperature, low pressure ammonia liquid in the second evaporating means and forming a second low temperature, low pressure ammonia gas by transferring heat from a second low temperature heat load to the second evaporating means thereby cooling the second low temperature heat load;

(n) transferring the second low temperature, low pressure ammonia gas from the second evaporating means to a second part of the adsorption/desorption means which is operating at a second lower temperature which is lower than the second upper temperature and physically adsorbing ammonia with the physical adsorbent therein, and automatically limiting ammonia gas flow in an entering direction thereto;

(o) providing at least one first closed heat transfer circuit containing a first heat transfer liquid, the first closed heat transfer circuit comprising a heat transfer element in thermal communication with each canister but not in fluid communication with the chemisorbent, heat exchange means in thermal communication with the first part of the adsorption/desorption means but not in fluid communication with the physical adsorbent; and (p) flowing the first heat transfer liquid through the heat transfer element of at least one canister, and then through the heat exchange means, wherein heating the first part of the adsorption/desorption means to the second upper temperature comprises the transferring of heat from the flowing first heat transfer liquid to the heat exchange means, and transferring heat from the heat exchange means to the first part of the adsorption/desorption means, thereby cascading heat from the higher temperature ammonia chemisorption circuit to the lower temperature ammonia physical adsorption circuit;

(q) regenerating heat within the adsorption/desorption means by transferring heat from the first part thereof to the second part thereof; and (r) transferring heat from the second part of the adsorption/desorption means to a third low temperature heat sink, thereby cooling the second part of the adsorption/desorption means.

6. The process of claim 5, wherein heating the at least one canister to the first upper temperature comprises heating the flowing first heat transfer liquid with the first heating means thereby producing a heated flowing first heat transfer liquid, and flowing the heated first heat transfer liquid to the at least one canister, and transferring heat from the heated flowing first heat transfer liquid to the at least one canister.

7. The process of claim 5, wherein heating, with the first heating means, the at least one canister to the first upper temperature is the entire net heat added to the process.

8. The process of claim 5, wherein the first low temperature heat load is an interior space in a structure, and wherein the second low temperature heat load is an interior space in the structure.

9. The process of claim 5, further comprising regenerating heat within the higher temperature chemisorption circuit by transferring heat from at least one hotter temperature canister to at least one cooler temperature canister.

10. The process of claim 5, further comprising, after the flowing first heat transfer liquid has transferred heat to the first part of the adsorption/desorption means, regenerating heat within the higher temperature chemisorption circuit by transferring heat from the flowing first heat transfer liquid to at least another one of the canisters.

11. The process of claim 5, wherein the first condensing means is also the second condensing means, wherein the first evaporating means is also the second evaporating means, and wherein the first low temperature heat load is also the second low temperature heat load.

12. The process of claim 5, wherein the second upper temperature is lower than the first lower temperature.

13. The process of claim 5, wherein the second upper temperature is higher than the first lower temperature.

14. The process of claim 5, further comprising, after flowing the first heat transfer liquid to the heat exchange means of the first part of the adsorption/desorption means, flowing the first heat transfer liquid through the heat transfer element of at least one other canister.

15. The process of claim 5, wherein the third low temperature heat sink is the ambient environment.

16. A heat cascading regenerative sorption heat pump process with rejected heat from a higher temperature chemisorption circuit powering a lower temperature physical adsorption circuit, the process comprising:

(a) providing a higher temperature ammonia chemisorption circuit containing ammonia and a chemisorbent therefor, the higher temperature ammonia chemisorption circuit comprising
a plurality of canisters, each containing the chemisorbent, the chemisorbent having a first chemical composition operable for chemisorbing and desorbing ammonia,
first heating means for heating each canister,
first condensing means for transferring heat from ammonia gas to a first low temperature heat sink, and for condensing ammonia gas, and
first evaporating means for evaporating ammonia liquid and forming ammonia gas;

(b) heating, with the first heating means, at least one canister to a first upper temperature and desorbing ammonia from the chemisorbent therein, thereby producing a first desorbed high temperature, high pressure ammonia gas;

(c) removing the first desorbed high temperature, high pressure ammonia gas from the at least one canister, and automatically limiting ammonia gas flow in an exiting direction therefrom;

(d) condensing the first desorbed high temperature, high pressure ammonia gas in the first condensing means thereby forming a first low temperature, high pressure ammonia liquid;

(e) converting the first low temperature, high pressure ammonia liquid to a first low temperature, low pressure ammonia liquid;

(f) evaporating the first low temperature, low pressure ammonia liquid in the first evaporating means and forming a first low temperature, low pressure ammonia gas by transferring heat from a first low temperature heat load to the first evaporating means thereby cooling the first low temperature heat load;

(g) transferring the first low temperature, low pressure ammonia gas from the first evaporating means to at least one other canister operating at a first lower temperature which is lower than the first upper temperature and chemisorbing ammonia with the chemisorbent therein, and automatically limiting ammonia gas flow in an entering direction thereto;

(h) providing a lower temperature ammonia physical adsorption circuit containing ammonia and a physical adsorbent therefor, the lower temperature ammonia physical adsorption circuit comprising
a plurality of physical adsorption compressors each containing the physical adsorbent, the physical adsorbent having a second chemical composition operable for physically adsorbing and desorbing ammonia, the second chemical composition being different than the first chemical composition,
second condensing means for transferring heat from ammonia gas to a second low temperature heat sink and for condensing ammonia gas, and
second evaporating means for evaporating ammonia liquid and forming ammonia gas;

(i) heating at least one compressor to a second upper temperature and desorbing ammonia from the physical adsorbent therein, thereby producing a second desorbed high temperature, high pressure ammonia gas, the second upper temperature being lower than the first upper temperature;

(j) removing the second desorbed high temperature, high pressure ammonia gas from the at least one compressor, and automatically limiting flow in an exiting direction therefrom;

(k) condensing the second desorbed high temperature, high pressure ammonia gas in the second condensing means thereby forming a second low temperature, high pressure ammonia liquid;

(l) converting the second low temperature, high pressure ammonia liquid to a second low temperature, low pressure ammonia liquid;

(m) evaporating the second low temperature, low pressure ammonia liquid in the second evaporating means and forming a second low temperature, low pressure ammonia gas by transferring heat from a second low temperature heat load to the second evaporating means thereby cooling the second low temperature heat load;

(n) transferring the second low temperature, low pressure ammonia gas from the second evaporating means to at least one other compressor which is operating at a second lower temperature which is lower than the second upper temperature and physically adsorbing ammonia with the physical adsorbent therein, and automatically limiting ammonia gas flow in an entering direction thereto;

(o) providing at least one first closed heat transfer circuit containing a first heat transfer liquid, the first closed heat transfer circuit comprising
a heat transfer element in thermal communication with each canister but not in fluid communication with the chemisorbent, and
heat exchange means in thermal communication with each compressor but not in fluid communication with the physical adsorbent; and (p) flowing the first heat transfer liquid through the heat transfer element of at least one canister, and then through the heat exchange means in thermal communication with the at least one compressor,
wherein heating the at least one compressor to the second upper temperature comprises transferring heat from the flowing first heat transfer liquid to the heat exchange means, and transferring heat from the heat exchange means to the at least one compressor, thereby cascading heat from the higher temperature ammonia chemisorption circuit to the lower temperature ammonia physical adsorption circuit;

(q) regenerating heat within the physical adsorption circuit by transferring heat from the at least one compressor to the at least one other compressor; and (r) cooling at least one compressor by transferring heat therefrom to a third low temperature heat sink.

17. The process of claim 16, wherein heating the at least one canister to the first upper temperature comprises heating the flowing first heat transfer liquid with the first heating means thereby producing a heated flowing first heat transfer liquid, and flowing the heated first heat transfer liquid to the at least one canister, and transferring heat from the heated flowing first heat transfer liquid to the at least one canister.

18. The process of claim 16, wherein heating, with the first heating means, the at least one canister to the first upper temperature is the entire net heat added to the process.

19. The process of claim 16, wherein the first condensing means is also the second condensing means, wherein the first evaporating means is also the second evaporating means, and wherein the first low temperature heat load is also the second low temperature heat load.

20. The process of claim 16, wherein the second upper temperature is lower than the first lower temperature.

21. The process of claim 16, wherein the second upper temperature is higher than the first lower temperature.

22. The process of claim 16, further comprising, after flowing the first heat transfer liquid to the heat exchange means of the at least one compressor, flowing the first heat transfer liquid through the heat transfer element of at least one other canister.

23. The process of claim 16, further comprising providing a second closed heat transfer circuit containing a second heat transfer liquid, the second closed heat transfer circuit comprising a heat transfer element in thermal communication with each compressor but not in fluid communication with the physical adsorbent, wherein regenerating heat within the physical adsorption circuit is by flowing the second heat transfer liquid through the heat transfer element of each compressor and transferring heat between the flowing second heat transfer liquid and the heat transfer elements.

24. The process of claim 23, wherein transferring heat from the heat exchange means to the at least one compressor comprises transferring heat from the heat exchange means to the flowing second heat transfer liquid, and then transferring heat from the flowing second heat transfer liquid to the heat transfer element of the at least one compressor.

25. The process of claim 23, further comprising:

directing the flowing second heat transfer liquid to and from the heat transfer elements of the compressors in a predetermined order so that the flowing second heat transfer liquid exiting from the third heat sink flows first to the heat transfer element of the compressor operating at the second lower temperature, then in series to the heat transfer elements of the other compressors, and then back to the third heat sink.

26. The process of claim 23, further comprising:

activating and deactivating the first heating means in a predetermined order;

directing the flowing first heat transfer liquid to and from the canisters in a predetermined order;

directing the flowing second heat transfer liquid to and from the heat transfer elements of the compressors in a predetermined order; and sequentially advancing the predetermined order of compressors being heated to the second upper temperature.

27. The process of claim 26, wherein directing the flowing first heat transfer liquid to and from the canisters in a predetermined order is such that the flowing first heat transfer liquid exiting from a canister cooling from the first upper temperature transfers heat indirectly to a compressor operating at the second upper temperature.

28. The process of claim 26, wherein directing the flowing first heat transfer liquid to and from the canisters in a predetermined order is such that the flowing first heat transfer liquid exiting from a canister cooling to the first lower temperature transfers heat indirectly to a compressor operating at the second upper temperature.

29. The process of claim 16, wherein the number of the at least one first closed heat transfer circuit is equal to the number of the canisters.

30. The process of claim 16, wherein the number of the at least one first closed heat transfer circuit is two.

31. The process of claim 16, wherein the number of the at least one first closed heat transfer circuit is two, and performing heating of the at least one canister to the first upper temperature in one of the closed first heat transfer circuits, and performing heating the at least one compressor to the second upper temperature in the other one of the closed first heat transfer circuits.

32. The process of claim 16, further comprising providing a second closed heat transfer circuit containing a flowing second heat transfer liquid, the second closed heat transfer circuit comprising a heat transfer element in thermal communication with each compressor but not in fluid communication with the physical adsorbent, wherein the heat exchange means comprises a plurality of heat exchangers, the number of heat exchangers being equal to the number of compressors, and further comprising pairing a heat exchanger with each compressor, and wherein transferring heat from the flowing first heat transfer liquid to the heat exchange means comprises
directing the flowing first heat transfer liquid from the canister cascading heat to the lower temperature ammonia chemisorption circuit, to the heat exchanger paired with the compressor receiving cascading heat from the higher temperature ammonia physical adsorption circuit, and directing the flowing second heat transfer liquid to the heat exchanger paired with the compressor receiving cascading heat thereby producing a heated flowing second heat transfer liquid, and thereafter flowing the heated second heat transfer liquid to the heat transfer element of the compressor receiving cascading heat.

33. The process of claim 16, further comprising controlling the second upper temperature during desorption of the physical adsorbent in each compressor so that the pressure in the compressor undergoing such desorption is equal to pressure in the canisters during desorption of the chemisorbent in the canisters.

34. A heat cascading regenerative sorption heat pump process with rejected heat from a higher temperature chemisorption circuit powering a lower temperature physical adsorption circuit, the process comprising:

(a) providing a higher temperature ammonia chemisorption circuit containing ammonia and a chemisorbent therefor, the higher temperature ammonia chemisorption circuit comprising a plurality of canisters, each containing the chemisorbent, the chemisorbent having a first chemical composition operable for chemisorbing and desorbing ammonia, each canister having a heat transfer element in thermal communication with the chemisorbent therein but not in fluid communication with the chemisorbent, first heating means for heating each canister, first condensing means for transferring heat from ammonia gas to a first low temperature heat sink, and for condensing ammonia gas, and first evaporating means for evaporating ammonia liquid and forming ammonia gas;

(b) heating, with the first heating means, at least one canister to a first upper temperature and desorbing ammonia from the chemisorbent therein, thereby producing a first desorbed high temperature, high pressure ammonia gas;

(c) removing the first desorbed high temperature, high pressure ammonia gas from the at least one canister, and automatically limiting ammonia gas flow in an exiting direction therefrom;

(d) condensing the first desorbed high temperature, high pressure ammonia gas in the first condensing means thereby forming a first low temperature, high pressure ammonia liquid;

(e) converting the first low temperature, high pressure ammonia liquid to a first low temperature, low pressure ammonia liquid;

(f) evaporating the first low temperature, low pressure ammonia liquid in the first evaporating means and forming a first low temperature, low pressure ammonia gas by transferring heat from a first low temperature heat load to the first evaporating means thereby cooling the first low temperature heat load;

(g) transferring the first low temperature, low pressure ammonia gas from the first evaporating means to at least one other canister operating at a first lower temperature which is lower than the first upper temperature and chemisorbing ammonia with the chemisorbent therein, and automatically limiting ammonia gas flow in an entering direction thereto;

(h) providing a lower temperature ammonia physical adsorption circuit containing ammonia and a physical adsorbent therefor, the lower temperature ammonia physical adsorption circuit comprising a plurality of physical adsorption compressors each containing the physical adsorbent, the physical adsorbent having a second chemical composition operable for physically adsorbing ammonia, the second chemical composition being different than the first chemical composition, each compressor having a heat transfer element in thermal communication with the physical adsorbent therein but not in fluid communication with the physical adsorbent, second condensing means for transferring heat from ammonia gas to a second low temperature heat sink and for condensing ammonia gas, and second evaporating means for evaporating ammonia liquid and forming ammonia gas;

(i) heating at least one compressor to a second upper temperature and desorbing ammonia from the physical adsorbent therein, thereby producing a second desorbed high temperature, high pressure ammonia gas, the second upper temperature being lower than the first lower temperature;

(j) removing the second desorbed high temperature, high pressure ammonia gas from the at least one compressor, and automatically limiting flow in an exiting direction therefrom;

(k) condensing the second desorbed high temperature, high pressure ammonia gas in the second condensing means thereby forming a second low temperature, high pressure ammonia liquid;

(l) converting the second low temperature, high pressure ammonia liquid to a second low temperature, low pressure ammonia liquid;

(m) evaporating the second low temperature, low pressure ammonia liquid in the second evaporating means and forming a second low temperature, low pressure ammonia gas by transferring heat from a second low temperature heat load to the second evaporating means thereby cooling the second low temperature heat load;

(n) transferring the second low temperature, low pressure ammonia gas from the second evaporating means to at least one other compressor which is operating at a second lower temperature which is lower than the second upper temperature and physically adsorbing ammonia with the physical adsorbent therein, and automatically limiting ammonia gas flow in an entering direction thereto;

(o) providing a plurality of heat exchangers, the number of the heat exchangers being equal to the number of the compressors, each heat exchanger having a first section in thermal communication with the a second section thereof, and pairing a heat exchanger with each compressor;

(p) providing a plurality of first closed heat transfer circuits each containing a first heat transfer liquid, the number of the first closed heat transfer circuits being equal to the number of the canisters, each first closed heat transfer circuit comprising the heat transfer element of one canister, the first section of at least one of the heat exchangers, and pumping means for flowing the first heat transfer liquid therein;

(q) providing a second closed heat transfer circuit containing a second heat transfer liquid, the second closed heat transfer circuit comprising the heat transfer elements of the compressors, the second sections of the heat exchangers, and pumping means for flowing the second heat transfer liquid therein;

(r) flowing the first heat transfer liquid through the heat transfer element of at least one canister, and then to the first section of one heat exchanger, wherein heating the at least one compressor to the second upper temperature comprises transferring heat from the flowing first heat transfer liquid in the first section to the flowing second heat transfer liquid in the second section, and transferring heat from the flowing second heat transfer liquid to the heat transfer element of the compressor being heated to the second upper temperature, thereby cascading heat from the higher temperature ammonia chemisorption circuit to the lower temperature ammonia physical adsorption circuit;

(s) regenerating heat within the physical adsorption circuit by flowing the second heat transfer liquid from the heat transfer element of the hottest compressor to the heat transfer element of another compressor, thereby transferring heat from the physical adsorbent in one compressor to the physical adsorbent in another compressor; and (t) cooling the second heat transfer liquid by transferring heat therefrom to a third low temperature heat sink and flowing the cooled second heat transfer liquid to one of the compressors thereby cooling it.

35. The process of claim 34, wherein heating the at least one canister to the first upper temperature comprises heating the flowing first heat transfer liquid with the first heating means thereby producing a heated flowing first heat transfer liquid, and flowing the heated first heat transfer liquid to the at least one canister, and transferring heat from the heated flowing first heat transfer liquid to the at least one canister.

36. The process of claim 34, wherein heating the at least one canister to the first upper temperature comprises heating it directly with the first heating means.

37. A heat cascading regenerative sorption heat pump process with rejected heat from a higher temperature chemisorption circuit powering a lower temperature water absorption circuit, the process comprising:

(a) providing a higher temperature ammonia chemisorption circuit containing ammonia and a chemisorbent, the chemisorbent having a first chemical composition operable for chemisorbing and desorbing ammonia, the higher temperature ammonia chemisorption circuit comprising a plurality of canisters each containing the chemisorbent, first condensing means, first evaporating means for cooling a low temperature heat load, first heating means for heating the chemisorbent to a first upper temperature for desorption of ammonia, and first cooling means for cooling the chemisorbent, operatively connected together, and wherein each canister has a heat transfer element in thermal communication with, but not in fluid communication with the chemisorbent;

(b) providing a lower temperature ammonia water absorption circuit containing ammonia and an absorbent selected from the group consisting of water and absorbent aqueous solutions operable for absorbing and desorbing ammonia, the lower temperature ammonia water absorption circuit comprising absorption/desorption means containing the absorbent, the absorption/desorption means having a first part for desorbing ammonia and a second part for absorbing ammonia, second condensing means, second evaporating means for cooling a low temperature heat load, second heating means for heating the first part of the absorption/desorption means and the absorbent therein to a second upper temperature for desorption of ammonia, and second cooling means for rejecting heat therefrom, operatively connected together;

(c) providing at least one first closed heat transfer circuit containing a first heat transfer liquid, the first heat transfer liquid being different than the chemisorbent, the absorbent and ammonia, the first closed heat transfer circuit comprising the heat transfer element of at least one canister, and heat exchange means in thermal communication with the first part of the absorption/desorption means but not in fluid communication with the absorbent; and (d) wherein cooling the chemisorbent by the first cooling means is by flowing the first heat transfer liquid through the heat transfer element of the at least one canister thereby cooling it,
wherein heating the first part of the absorption/desorption means and the absorbent therein by the second heating means to a second upper temperature for desorption of ammonia is by flowing the first heat transfer liquid from the at least one canister through the heat exchange means thereby heating the first part, and thereby cascading heat from the higher temperature ammonia chemisorption circuit to the lower temperature ammonia water absorption circuit; and (e) regenerating heat within the absorption/desorption means by transferring heat from the first part thereof to the second part thereof.

38. The process of claim 37 wherein the first heating means for heating the chemisorbent to a first upper temperature for desorption of ammonia provides the entire net heat added to the process.

39. The process of claim 37 wherein the second cooling means for rejecting heat from the lower temperature ammonia water absorption circuit is by transferring heat from the second part of the absorption/desorption means to a third low temperature heat sink, thereby cooling the second part of the absorption/desorption means.

40. The process of claim 37, wherein the chemisorbent is selected from the group consisting of $MgCl_2$, $CaBr_2$, $SrBr_2$, $CoBr_2$, and solid inorganic ammoniated complex compounds.

41. The process of claim 37, wherein the absorbent is water.

42. The process of claim 41, wherein the first part of the absorption/desorption means is a generator for separating a strong aqueous ammonia solution into a gaseous ammonia stream and a weak aqueous ammonia solution stream, and wherein the second part of the absorption/desorption means is an absorber for absorbing a gaseous ammonia stream in the weak aqueous ammonia solution stream.

43. The process of claim 42, wherein the ammonia water absorption circuit containing ammonia is an AHE circuit.

44. The process of claim 42, wherein the ammonia water absorption circuit containing ammonia is a GAX circuit.

45. A heat cascading regenerative sorption heat pump process with rejected heat from a higher temperature chemisorption circuit powering a lower temperature water absorption circuit, the process comprising:

(a) providing a higher temperature ammonia chemisorption circuit containing ammonia and a chemisorbent, the higher temperature ammonia chemisorption circuit comprising
a plurality of canisters, each containing the chemisorbent, the chemisorbent having a first chemical composition operable for chemisorbing and desorbing ammonia,
first heating means for heating each canister,
first condensing means for transferring heat from ammonia gas to a first low temperature heat sink, and for condensing ammonia gas, and
first evaporating means for evaporating ammonia liquid and forming ammonia gas;

(b) heating, with the first heating means, at least one canister to a first upper temperature and desorbing ammonia from the chemisorbent therein, thereby producing a first desorbed high temperature, high pressure ammonia gas;

(c) removing the first desorbed high temperature, high pressure ammonia gas from the at least one canister, and automatically limiting ammonia gas flow in an exiting direction therefrom;

(d) condensing the first desorbed high temperature, high pressure ammonia gas in the first condensing means thereby forming a first low temperature, high pressure ammonia liquid;

(e) converting the first low temperature, high pressure ammonia liquid to a first low temperature, low pressure ammonia liquid;

(f) evaporating the first low temperature, low pressure ammonia liquid in the first evaporating means and forming a first low temperature, low pressure ammonia gas by transferring heat from a first low temperature heat load to the first evaporating means thereby cooling the first low temperature heat load;

(g) transferring the first low temperature, low pressure ammonia gas from the first evaporating means to at least one other canister operating at a first lower temperature which is lower than the first upper temperature and chemisorbing ammonia with the chemisorbent therein, and automatically limiting ammonia gas flow in an entering direction thereto;

(h) providing a lower temperature ammonia water absorption circuit containing ammonia and an absorbent, the lower temperature ammonia water absorption circuit comprising
 absorption/desorption means containing the absorbent, the absorbent being selected from the group consisting of water and absorbent aqueous solutions operable for absorbing and desorbing ammonia,
 second condensing means for transferring heat from ammonia gas to a second low temperature heat sink and for condensing ammonia gas, and
 second evaporating means for evaporating ammonia liquid and forming ammonia gas;

(i) heating a first part of the absorption/desorption means to a second upper temperature and desorbing ammonia from the absorbent therein, thereby producing a second desorbed high temperature, high pressure ammonia gas, the second upper temperature being lower than the first upper temperature;

(j) removing the second desorbed high temperature, high pressure ammonia gas from the first part of the absorption/desorption means;

(k) condensing the second desorbed high temperature, high pressure ammonia gas in the second condensing means thereby forming a second low temperature, high pressure ammonia liquid;

(l) converting the second low temperature, high pressure ammonia liquid to a second low temperature, low pressure ammonia liquid;

(m) evaporating the second low temperature, low pressure ammonia liquid in the second evaporating means and forming a second low temperature, low pressure ammonia gas by transferring heat from a second low temperature heat load to the second evaporating means thereby cooling the second low temperature heat load;

(n) transferring the second low temperature, low pressure ammonia gas from the second evaporating means to a second part of the absorption/desorption means which is operating at a second lower temperature which is lower than the second upper temperature and absorbing ammonia with the absorbent therein;

(o) providing at least one first closed heat transfer circuit containing a first heat transfer liquid, the first closed heat transfer circuit comprising
 a heat transfer element in thermal communication with each canister but not in fluid communication with the chemisorbent,
 heat exchange means in thermal communication with the first part of the absorption/desorption means but not in fluid communication with the absorbent; and (p) flowing the first heat transfer liquid through the heat transfer element of at least one canisters and then through the heat exchange means of the first part of the absorption/desorption means,
 wherein heating the first part of the absorption/desorption means to the second upper temperature comprises the transferring of heat from the flowing first heat transfer liquid to the heat exchange means, and transferring heat from the heat exchange means to the first part of the absorption/desorption means, thereby cascading heat from the higher temperature ammonia chemisorption circuit to the lower temperature ammonia water absorption circuit;

(q) regenerating heat within the absorption/desorption means by transferring heat from the first part thereof to the second part thereof; and (r) transferring heat from the second part of the absorption/desorption means to a third low temperature heat sink, thereby cooling the second part of the absorption/desorption means.

46. The process of claim 45, wherein the second upper temperature is lower than the first lower temperature.

47. The process of claim 16, wherein the compressors are two stage.

48. The process of claim 16, wherein the compressors are two stage, and wherein the low temperature heat load being cooled by the process is a refrigerator and freezer.

* * * * *